United States Patent [19]

Shiomi

[11] Patent Number: 6,104,502
[45] Date of Patent: *Aug. 15, 2000

[54] METHOD AND APPARATUS FOR GENERATING HALFTONE DOTS FOR COLOR PRINTING

[75] Inventor: Junichi Shiomi, Kyoto, Japan

[73] Assignee: Dainippon Screen Mfg. Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,710

[22] Filed: Apr. 30, 1997

[30] Foreign Application Priority Data

Apr. 30, 1996 [JP] Japan .................................. 8-132821

[51] Int. Cl.7 ...................................................... H04N 1/52
[52] U.S. Cl. ............................................. 358/1.9; 358/534
[58] Field of Search .................................... 382/237, 252, 382/270; 358/456, 457, 459, 526, 528, 533, 534, 535, 536; 395/109, 111

[56] References Cited

U.S. PATENT DOCUMENTS

| | | |
|---|---|---|
| 3,922,484 | 11/1975 | Keller ........................................ 358/534 |
| 4,084,259 | 4/1978 | Cahill et al. ............................. 358/429 |
| 4,468,706 | 8/1984 | Cahill ....................................... 358/454 |
| 4,486,788 | 12/1984 | Yamada .................................... 358/534 |
| 4,672,432 | 6/1987 | Sakurada et al. ........................ 358/534 |
| 4,985,779 | 1/1991 | Gall .......................................... 358/456 |
| 5,299,020 | 3/1994 | Carlebach ................................ 358/536 |
| 5,323,245 | 6/1994 | Rylander .................................. 358/536 |
| 5,331,438 | 7/1994 | Harrington ............................... 358/534 |
| 5,371,612 | 12/1994 | Sakamoto ................................. 358/456 |
| 5,734,801 | 3/1998 | Noguchi et al. ......................... 395/109 |

FOREIGN PATENT DOCUMENTS 60-41343 9/1985 Japan .

*Primary Examiner*—Amelia Au
*Assistant Examiner*—Samir Ahmed
*Attorney, Agent, or Firm*—McDermott, Will & Emery

[57] ABSTRACT

Threshold values are generated in order to disperse isolated dots in an irregular manner when an level of an image signal is between a first signal level and a second signal level. The first signal level is a level at which one isolated dot consisting of one pixel is formed in each one-dot area including one halftone dot, and the second signal level is a level at which no isolated dot consisting of one pixel is formed in each one-dot area. The threshold values are then compared with the image signal, to generate a halftone dot signal representing halftone dots.

15 Claims, 28 Drawing Sheets

NUMBER OF PIXELS N IN EACH ONE-DOT AREA HA : $N = \dfrac{Dp^2}{Dh^2}$

Dp: OUTPUT RESOLUTION [dpi]

Dh: SCREEN RULING [lpi]

NUMBER OF TONES REPRODUCIBLE BY ONE HALFTONE DOT : $M \leq N = \dfrac{Dp^2}{Dh^2}$

Fig. 2

LIGHTING-UP PATTERNS OBTAINED BY REGULARLY OMITTING LIT-UP PIXELS

| FIGURES | DETAILS |
|---|---|
| FIG. 3 | LIGHTING UP ONE PIXEL IN EACH ONE-DOT AREA (FIRST STANDARD LIGHTING-UP PATTERN) $\theta = 45°$ |
| FIG. 4 | LARGE REGIONAL VIEW OF FIG. 3 |
| FIG. 5 | REGULARLY OMITTING LIT-UP PIXELS FROM FIRST STANDARD LIGHTING-UP PATTERN AT THE RATIO OF 1/2 $\theta = 0°$ |
| FIG. 6 | LARGE REGIONAL VIEW OF FIG. 5 |
| FIG. 7 | REGULARLY OMITTING LIT-UP PIXELS FROM FIRST STANDARD LIGHTING-UP PATTERN AT THE RATIO OF 3/4 $\theta = 45°$ |
| FIG. 8 | LARGE REGIONAL VIEW OF FIG. 7 |
| FIG. 9 | LIGHTING UP ONE PIXEL IN EACH ONE-DOT AREA (SECOND STANDARD LIGHTING-UP PATTERN) $\theta = 15°$ |
| FIG. 10 | LARGE REGIONAL VIEW OF FIG. 9 |
| FIG. 11 | REGULARLY OMITTING LIT-UP PIXELS FROM SECOND STANDARD LIGHTING-UP PATTERN AT THE RATIO OF 4/5 $\theta = 41.8°$ |
| FIG. 12 | LARGE REGIONAL VIEW OF FIG. 11 |
| FIG. 13 | FIG. 3 + FIG. 9 |
| FIG. 14 | LARGE REGIONAL VIEW OF FIG. 13 |
| FIG. 15 | FIG. 7 + FIG. 11 |
| FIG. 16 | LARGE REGIONAL VIEW OF FIG. 15 |

OMITTING LIT-UP PIXELS FROM FIRST STANDARD
LIGHTING-UP PATTERN
AT THE RATIO OF 1/2
( $\theta = 0°$ )

LARGE REGIONAL VIEW OF FIG. 9 ( $\theta = 15°$ )
(SECOND STANDARD LIGHTING-UP PATTERN)

LARGE REGIONAL VIEW OF FIG. 11 ($\theta = 41.8°$)
(OMITTING LIT-UP PIXELS FROM SECOND STANDARD
LIGHTING-UP PATTERN AT THE RATIO OF 4/5)

LARGE REGIONAL VIEW OF FIG. 13 (FIG. 3 + FIG. 9)

LARGE REGIONAL VIEW OF FIG. 15 (FIG. 7 + FIG. 11)

Fig. 17(A)

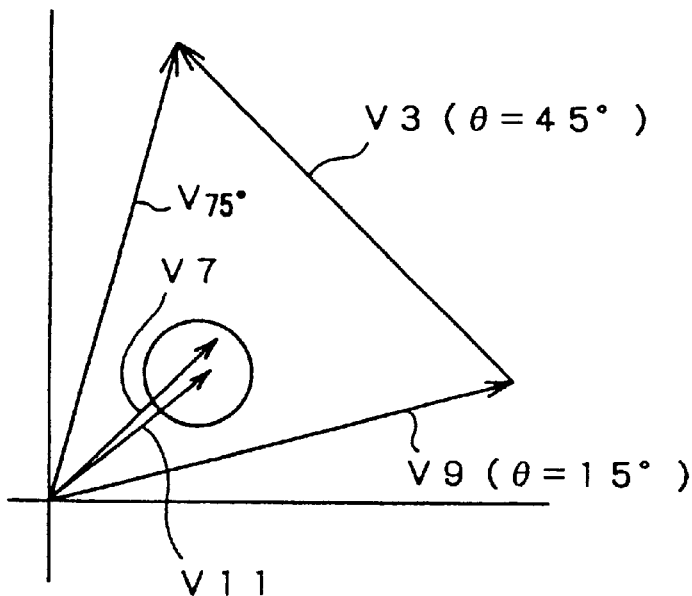

Fig. 17(B)

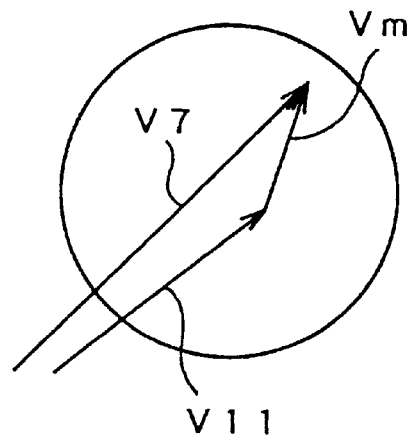

V3: WAVE NUMBER VECTOR IN THE PATTERN OF FIG. 3
V7: WAVE NUMBER VECTOR IN THE PATTERN OF FIG. 7
V9: WAVE NUMBER VECTOR IN THE PATTERN OF FIG. 9
V11: WAVE NUMBER VECTOR IN THE PATTERN OF FIG. 11
Vm: WAVE NUMBER VECTOR IN MOIRES OF FIG. 16

[WAVE NUMBER VECTORS]: VECTORS HAVING A LENGTH
EQUAL TO THE RECIPROCAL OF A REPEATING CYCLE
(OR SCREEN RULING) AND A DIRECTION EQUIVALENT
TO THE SCREEN ANGLE $\theta$

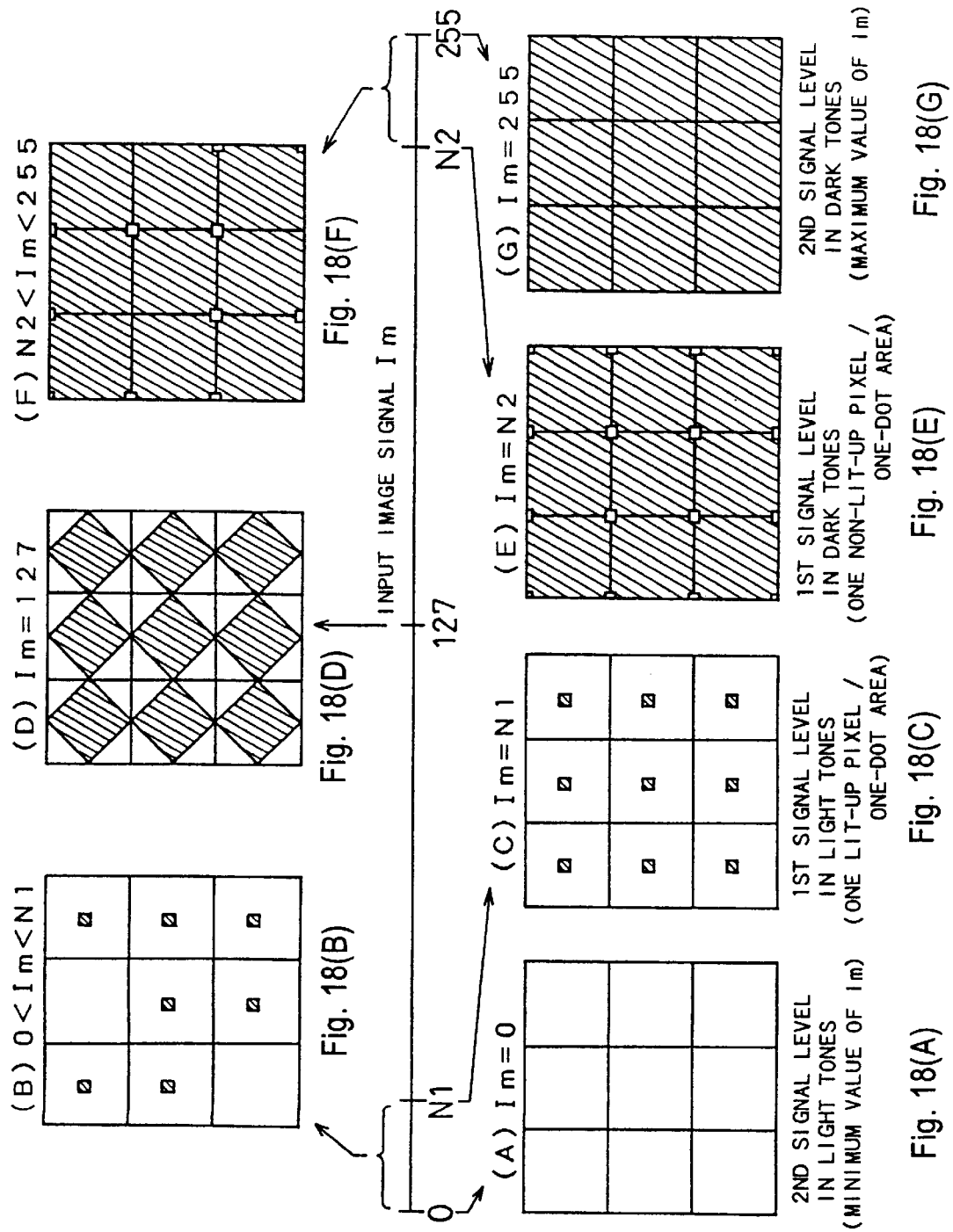

Fig. 20

| FIGURES | DETAILS |
|---|---|
| | LIGHTING-UP PATTERNS OBTAINED BY IRREGULARLY OMITTING LIT-UP PIXELS (FIRST EMBODIMENT) |
| FIG. 21 | IRREGULARLY OMITTING LIT-UP PIXELS FROM FIRST STANDARD LIGHTING-UP PATTERN AT THE RATIO OF 1/2<br>$\theta = 45°$ |
| FIG. 22 | IRREGULARLY OMITTING LIT-UP PIXELS FROM FIRST STANDARD LIGHTING-UP PATTERN AT THE RATIO OF 3/4<br>$\theta = 45°$ |
| FIG. 23 | IRREGULARLY OMITTING LIT-UP PIXELS FROM SECOND STANDARD LIGHTING-UP PATTERN AT THE RATIO OF 4/5<br>$\theta = 15°$ |
| FIG. 24 | FIG. 22 + FIG. 23 |

IRREGULARLY OMITTING LIT-UP PIXELS FROM FIRST
STANDARD LIGHTING-UP PATTERN AT THE RATIO OF 1/2
($\theta = 45°$)

IRREGULARLY OMITTING LIT-UP PIXELS FROM FIRST
STANDARD LIGHTING-UP PATTERN AT THE RATIO OF 3/4
( $\theta = 45°$ )

SCREEN THRESHOLD PATTERN WITH DISTRIBUTION OF
OMITTED PIXELS IRREGULARLY DISPERSED

IRREGULARLY OMITTING LIT-UP PIXELS FROM SECOND STANDARD LIGHTING-UP PATTERN AT THE RATIO OF 4/5 ($\theta = 15°$)

SCREEN THRESHOLD PATTERN WITH DISTRIBUTION OF OMITTED PIXELS IRREGULARLY DISPERSED

REGULARLY OMITTING LIT-UP PIXELS FROM STANDARD LIGHTING-UP PATTERN OF $\theta = 45°$ AT THE RATIO OF 3/4
AND
IRREGULARLY OMITTING LIT-UP PIXELS FROM STANDARD LIGHTING-UP PATTERN OF $\theta = 15°$ AT THE RATIO OF 4/5

IRREGULARLY OMITTING LIT-UP PIXELS FROM STANDARD
LIGHTING-UP PATTERN OF θ =45° AT THE RATIO OF 3/4
AND
REGULARLY OMITTING LIT-UP PIXELS FROM STANDARD
LIGHTING-UP PATTERN OF θ =15° AT THE RATIO OF 4/5

METHOD AND APPARATUS FOR GENERATING HALFTONE DOTS FOR COLOR PRINTING

BACKGROUND OF THE INVENTION

1. Field of the Invention

The present invention relates to a technique of generating halftone dots for color printing according to an image signal, and more particularly to prevention of moiré in a color print.

2. Description of the Related Art

FIG. 1 shows a relationship between an output resolution Dp [dpi] (dots/inch) of halftone dots and their screen ruling Dh [lpi] (lines/inch). The output resolution Dp represents a number of pixels per inch in an output image generated by an output device such as an image recorder or a printer. As shown in FIG. 1, the output resolution Dp is equal to the reciprocal of a width of one pixel PX, or the reciprocal of a pixel pitch. The screen ruling Dh represents a number of halftone dots per inch in a halftone dot image. As shown in FIG. 1, the screen ruling Dh is equal to the reciprocal of the width of a one-dot area HA, or the reciprocal of a halftone dot pitch. The 'one-dot area HA' here denotes an area in which one halftone dot is formed.

As shown in the bottom of FIG. 1, a number of pixels N included in one one-dot area HA is expressed by Equation (1) given below:

$$N = Dp^2/Dh^2 \qquad (1)$$

A number of tones M reproducible by one halftone dot is not greater than the number of pixels N included in one one-dot area HA, as expressed by the following Inequality (2):

$$M \leq N \qquad (2)$$

Equation (1) and Inequality (2) show that a relationship defined by the following Inequality (3) is held between the number of tones M reproducible by one halftone dot, the output resolution Dp, and the screen ruling Dh:

$$Dh * \sqrt{M} \leq Dp \qquad (3)$$

Inequality (3) gives the required output resolution Dp to achieve the desired screen ruling Dh and the desired number of tones M. By way of example, in order to achieve the screen ruling Dh of 175 lpi and M=256 tones, Inequality (3) indicates that the output resolution Dp is required to be not less than 2800 dpi.

The output resolution Dp is usually set equal to 4000 dpi in the conventional high-quality printing process. This output resolution Dp can sufficiently express 256 tones in each one-dot area HA. It is here assumed that the level of the image signal is in the range of 0 to 255. At least one pixel is recorded or lit up in each one-dot area HA when the level of the image signal is equal to 1. When the level of the image signal is equal to 254, at least one pixel remains unrecorded or in a non-lit-up state in each one-dot area HA Recently, demand for high-speed image output has been increasing, and it is desired to lower the output resolution Dp while maintaining the number of tones M. AS clearly shown by Inequality (3) given above, however, the number of tones M reproducible by one halftone dot decreases with a decrease in the output resolution Dp.

SUMMARY OF THE INVENTION

Accordingly, an object of the present invention is to produce a halftone dot image having a relatively large apparent number of tones by a relatively low output resolution.

Another object of the present invention is to alleviate moiré in a color print which is reproduced by overlaying a plurality of halftone dot images.

The present invention is directed to a method of generating halftone dots in a plurality of one-dot areas in a halftone dot image for use in color printing in response to an image signal. The one-dot area is an area in which one halftone dot is to be formed. The method comprises the steps of: (a) providing threshold values to make isolated dots in the halftone dot image to be dispersed in an irregular manner when a level of the image signal is between a first signal level and a second signal level, and (b) comparing the threshold values with the image signal, thereby generating a halftone dot signal representing the halftone dots. The isolated dots are halftone dots each consisting of one pixel separated from other halftone dots. The first signal level is a level at which one isolated dot is formed in each of the plurality of one-dot areas, and the second signal level is a level at which no isolated dots are formed in the plurality of one-dot areas. Since the isolated dots are dispersed in an irregular manner when the image signal is between the first signal level and the second signal level, overlapping of a plurality of such halftone dot patterns would not cause moiré. The dispersion of the isolated dots further attains a relative increase in an apparent number of tones with a relatively low output resolution.

In a preferred embodiment, the first signal level may include a first light-tone level in a light tone range of the image signal and a first dark-tone level in a dark tone range of the image signal. The first light-tone level is a level at which a single pixel is recorded in each of the plurality of one-dot areas, and the first dark-tone level is a level at which a single pixel is left unrecorded in each of the plurality of one-dot areas. The second signal level includes a second light-tone level in the light tone range of the image signal and a second dark-tone level in the dark tone range of the image signal. The second light-tone level is a level at which no pixels are recorded in any of the plurality of one-dot areas, and the second dark-tone level is a level at which all pixels are recorded in all of the plurality of one-dot areas. The halftone dots have a specific halftone structure that is defined by a screen ruling and a screen angle in a middle tone between the first light-tone level and the first dark-tone level.

The step (a) may comprise the steps of: preparing a threshold pattern for covering a unit block area, the threshold pattern comprising a distribution of the threshold values so that the isolated dots are dispersed in an irregular manner when the level of the image signal is between the first signal level and the second signal level; and reading the threshold values to be compared with the image signal from the threshold pattern.

Alternatively, the step (a) may comprise the steps of: preparing a threshold pattern for covering a unit block area; and modifying a threshold value included in the threshold pattern in an irregular manner when the level of the image signal is between the first signal level and the second signal level, thereby providing a modified threshold value to be compared with the image signal.

The threshold pattern may include zero, a value smaller by one than the second dark-tone level, and values ranging from the first light-tone level to the first dark-tone level.

The step of modifying may include the steps of: modifying the threshold value to be a random number between the second light-tone level and the first light-tone level except the first light-tone level when the threshold value read from the threshold pattern is between the second light-tone level and the first light-tone level; and modifying the threshold value to be a random number between the first dark-tone level and the second dark-tone level except the second dark-tone level when the threshold value read from the threshold pattern is between the first dark-tone level and the second dark-tone level.

According to an aspect of the present invention, the method further comprises the steps of: (c) recording a halftone dot image according to the halftone dot signal; and (d) printing a plurality of the halftone dot images, which are prepared by the steps (a) through (c), one over another in respective colors, thereby reproducing a color print.

According to another aspect of the present invention, an apparatus for generating halftone dots comprises: threshold providing means for providing threshold values to make isolated dots in the halftone dot image to be dispersed in an irregular manner when a level of the image signal is between a first signal level and a second signal level; and a comparator for comparing the threshold values with the image signal, thereby generating a halftone dot signal representing the halftone dots.

The present invention is also directed to a computer program product for generating halftone dots which comprises: a computer readable media; and computer program code means recorded on the computer readable media; wherein the computer program code means comprises: program code means for causing a computer to provide threshold values to make isolated dots in the halftone dot image to be dispersed in an irregular manner when a level of the image signal is between a first signal level and a second signal level; and program code means for causing the computer to compare the threshold values with the image signal, thereby generating a halftone dot signal representing the halftone dots.

These and other objects, features, aspects, and advantages of the present invention will become more apparent from the following detailed description of the preferred embodiments with the accompanying drawings.

BRIEF DESCRIPTION OF THE DRAWINGS

FIG. 2 is a table showing details of the lighting-up patterns shown in FIGS. 3 16;

FIGS. 17(A) and 17(B) are graphs showing wave number vectors related to the moires in the lighting-up pattern of FIG. 16;

FIGS. 18(A)–18(G) show lighting-up patterns in the preferred embodiment of the present invention;

FIG. 20 is a table showing the details of the lighting-up patterns of FIGS. 21–24 in the first embodiment;

DESCRIPTION OF THE PREFERRED EMBODIMENT

A. Lighting-up Patterns

The number of tones of a halftone dot image can be increased by using a set of plural halftone dots to express the tones. This method may, however, cause moires in a color print which is generated by overprinting the halftone dot images for the primary colors. The following describes examples of halftone dot patterns obtained by using a set of plural halftone dots to express the tones. In this specification, the halftone dot patterns are also referred to as "lighting-up patterns" and the pixels to be recorded are referred to as "lit-up pixels" because they are to be exposed by light beams in an optical image recording device. FIG. 2 is a table showing the details of the lighting-up patterns of FIGS. 3–16.

Figure 1:
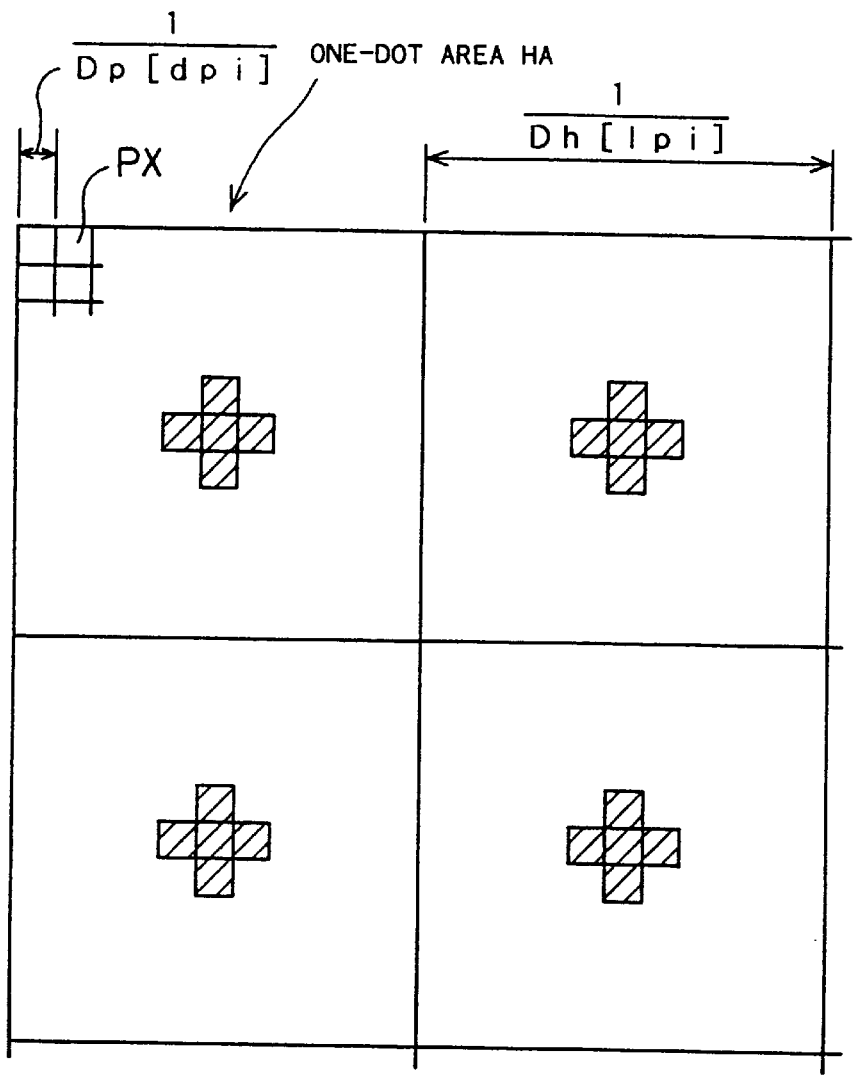
FIG. 1 shows the relationship between a output resolution and a screen ruling.
Figure 3:
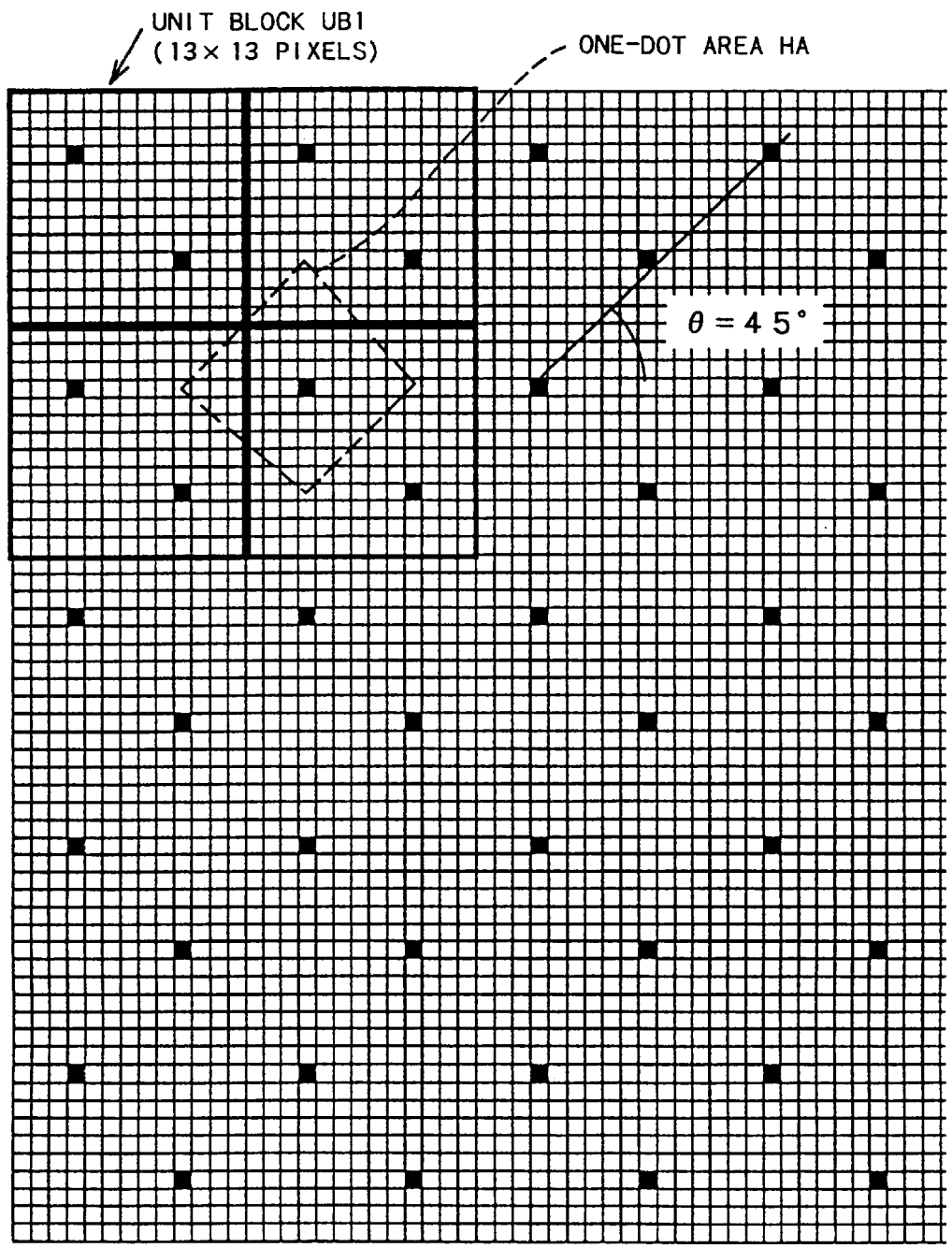
FIG. 3 shows a first standard lighting-up pattern, in which one pixel is lit up in each one-dot area.
Figure 4:
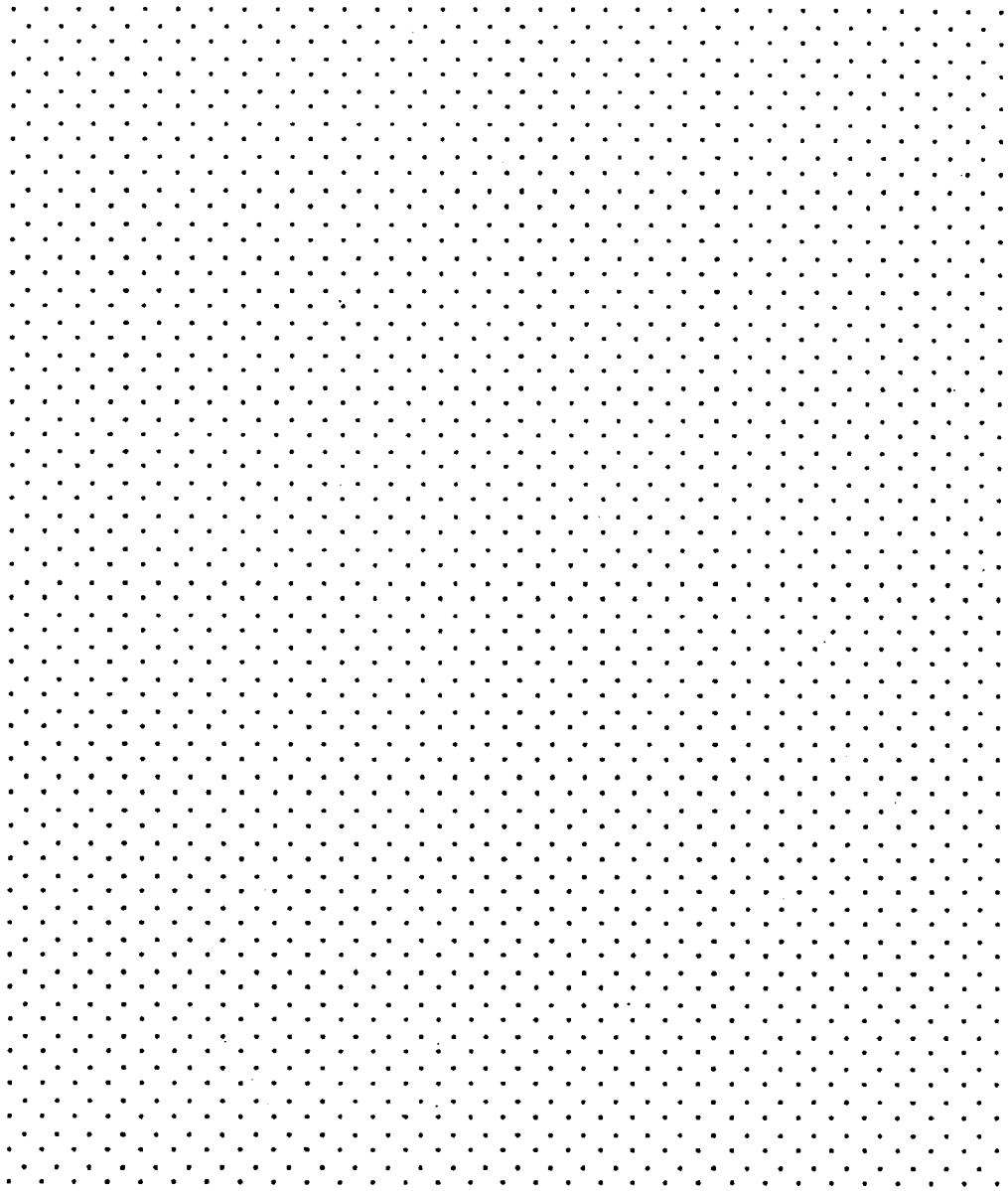
FIG. 4 is a large regional view of FIG. 3.

FIG. 3 shows a lighting-up pattern where one pixel is lit up in each one-dot area while using a unit block UB1 having a screen angle θ of 0°. This pattern will be hereinafter referred to as first standard lighting-up pattern. The unit block UB1 is an area covered by one threshold pattern, which is used to generate a halftone dot image signal from a multi-tone image signal The threshold pattern is also referred to as 'screen pattern'. The unit block UB1 has a size corresponding to two one-dot areas HA. Since the unit block UB1 has the size of 13×13 pixels, the one-dot area HA includes (13×13)/2=84.5 pixels. The halftone dot pitch is accordingly given as √84.5≈9.19 pixels. The screen ruling Dh is equal to the output resolution Dp divided by a halftone dot pitch [pixels]. When the output resolution Dp is assumed to be 1500 dpi, the exact screen ruling in the lighting-up pattern of FIG. 3 is given as 1500/9.19≈163 [lpi]. FIG. 4 is a large regional view showing the lighting-up pattern of FIG. 3 over a wider area.

The above relationship between the unit block UB1 and the one-dot area HA is only an example. The lighting-up patterns discussed below are also only for the illustrative purpose. The screen angle θ and the screen ruling define the periodicity of the screen structure as discussed below, and is thus important when a plurality of lighting-up patterns are laid one upon another to produce a color print.

Figure 5:
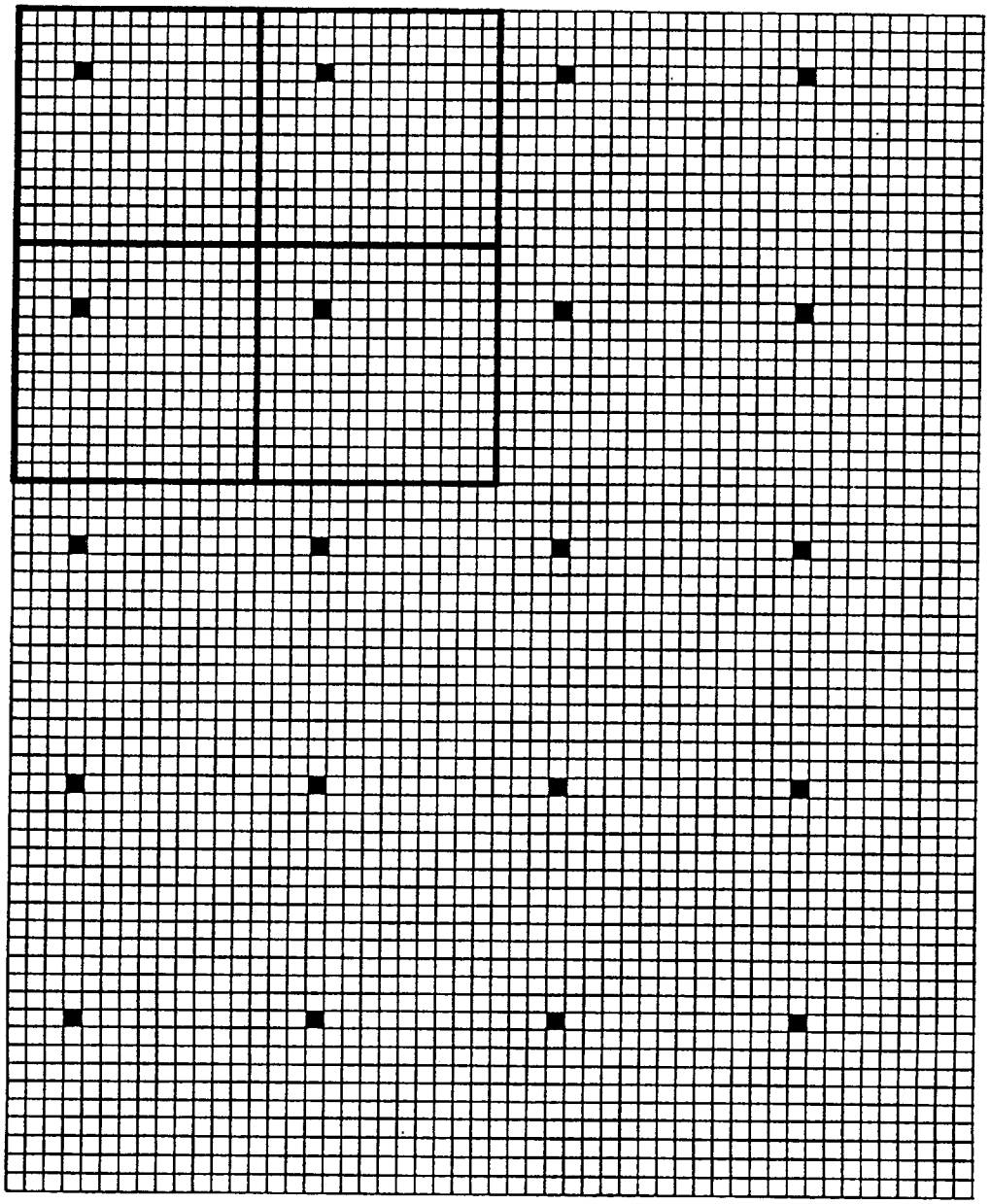
FIG. 5 shows a lighting-up pattern obtained by omitting lit-up pixels from the first standard lighting-up pattern at the ratio of one pixel per two one-dot areas.
Figure 6:
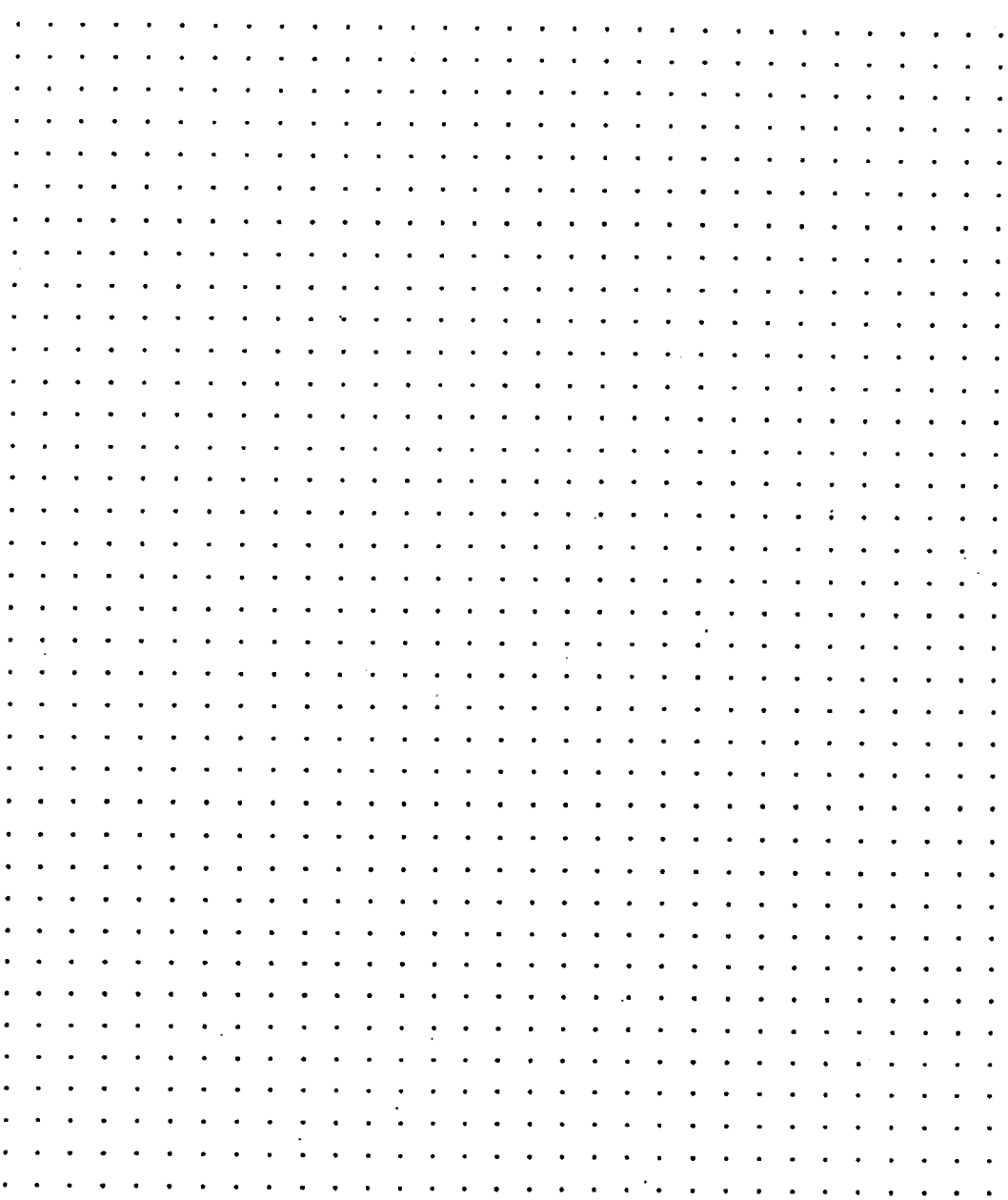
FIG. 6 is a large regional view of FIG. 5.

FIG. 5 shows a lighting-up pattern obtained by regularly omitting some lit-up pixels from the first standard lighting-up pattern shown in FIG. 3 at the ratio of one pixel per two one-dot areas, which will be simply referred to as the ratio of ½. It is clearly understood that the screen angle θ is substantially equal to 0° in the lighting-up pattern of FIG. 5 and that the screen ruling thereof is √2 times as large as the screen ruling of the first standard halftone pattern shown in FIG. 3. The lighting-up pattern of FIG. 5 has a significantly different periodicity of the screen structure, which is defined by the screen angle and the screen ruling, from that of the original first standard lighting-up pattern. FIG. 6 is a large regional view of FIG. 5.

The lighting-up pattern shown in FIGS. 5 and 6 appears when a desired number of tones M is reproduced by a set of plural one-dot areas with the output resolution lower than that of the first standard lighting-up pattern. Namely the lighting-up pattern of FIGS. 5 and 6 is obtained by omitting some lit-up pixels in a regular manner at the ratio of one pixel per two one-dot areas when the tone level of the image signal is approximately 1/M. The 'tone level' in this specification denotes the image signal level which is normalized to have the range of 0 to 1. In case that the tone level of the image signal is approximately (M−1)/M, a pattern of non-lit-up pixels is obtained as an inversion of the lighting-up pattern of FIGS. 5 and 6. The isolated lit-up pixels each consisting of only one pixel, and the isolated non-lit-up pixels each consisting of only one pixel, are hereinafter referred to as 'isolated dots'.

As discussed previously, the lighting-up pattern of FIGS. 5 and 6 has the screen structure of a significantly different periodicity from that of the original first standard lighting-up pattern shown in FIGS. 3 and 4. In other words, halftone dots having the screen structure of a significantly different periodicity from that of the original standard lighting-up pattern are obtained by regularly omitting some original isolated dots when the tone level of the image signal is approximately 1/M or (M−1)/M.

Figure 7:
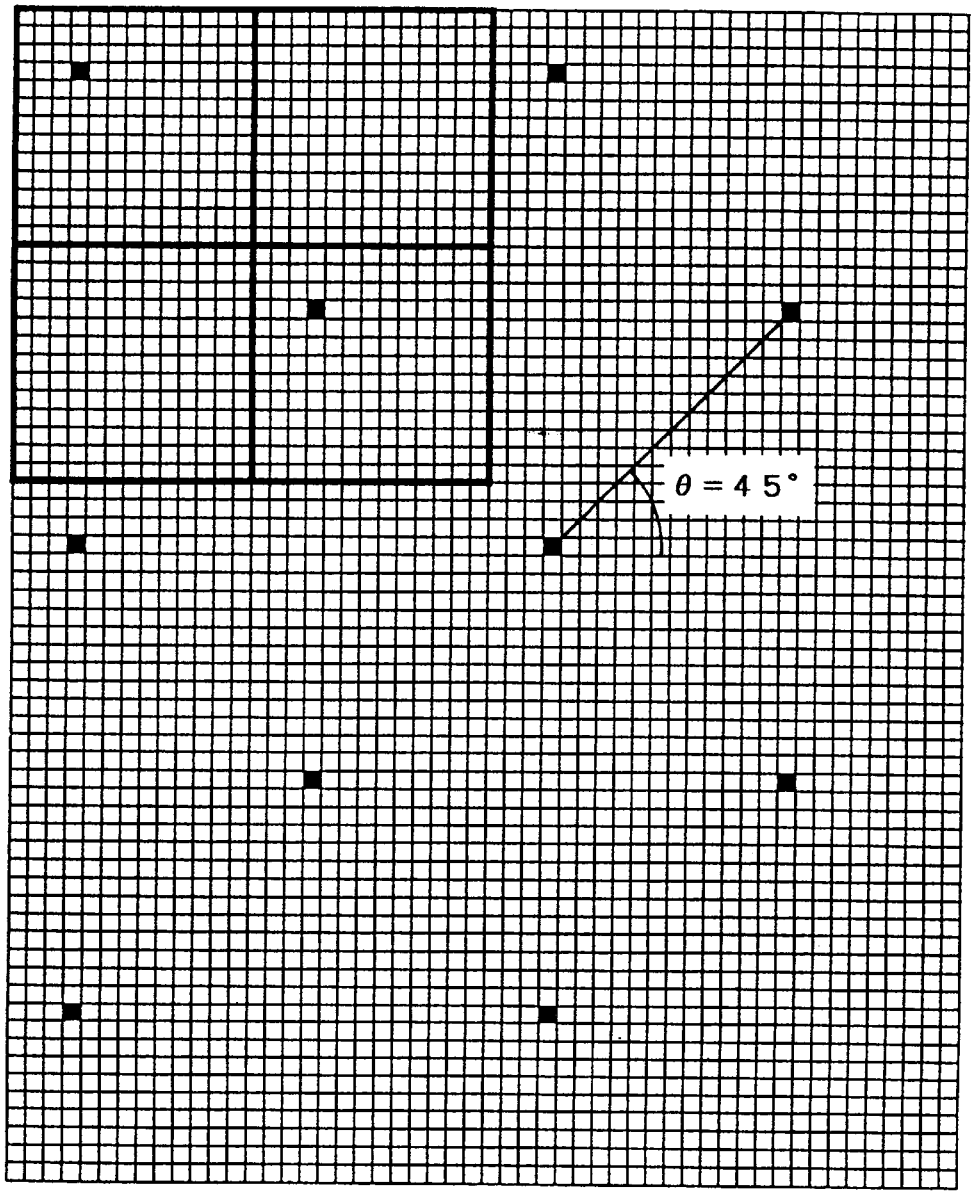
FIG. 7 shows a lighting-up pattern obtained by omitting lit-up pixels from the first standard lighting-up pattern at the ratio of three pixels per four one-dot areas.
Figure 8:
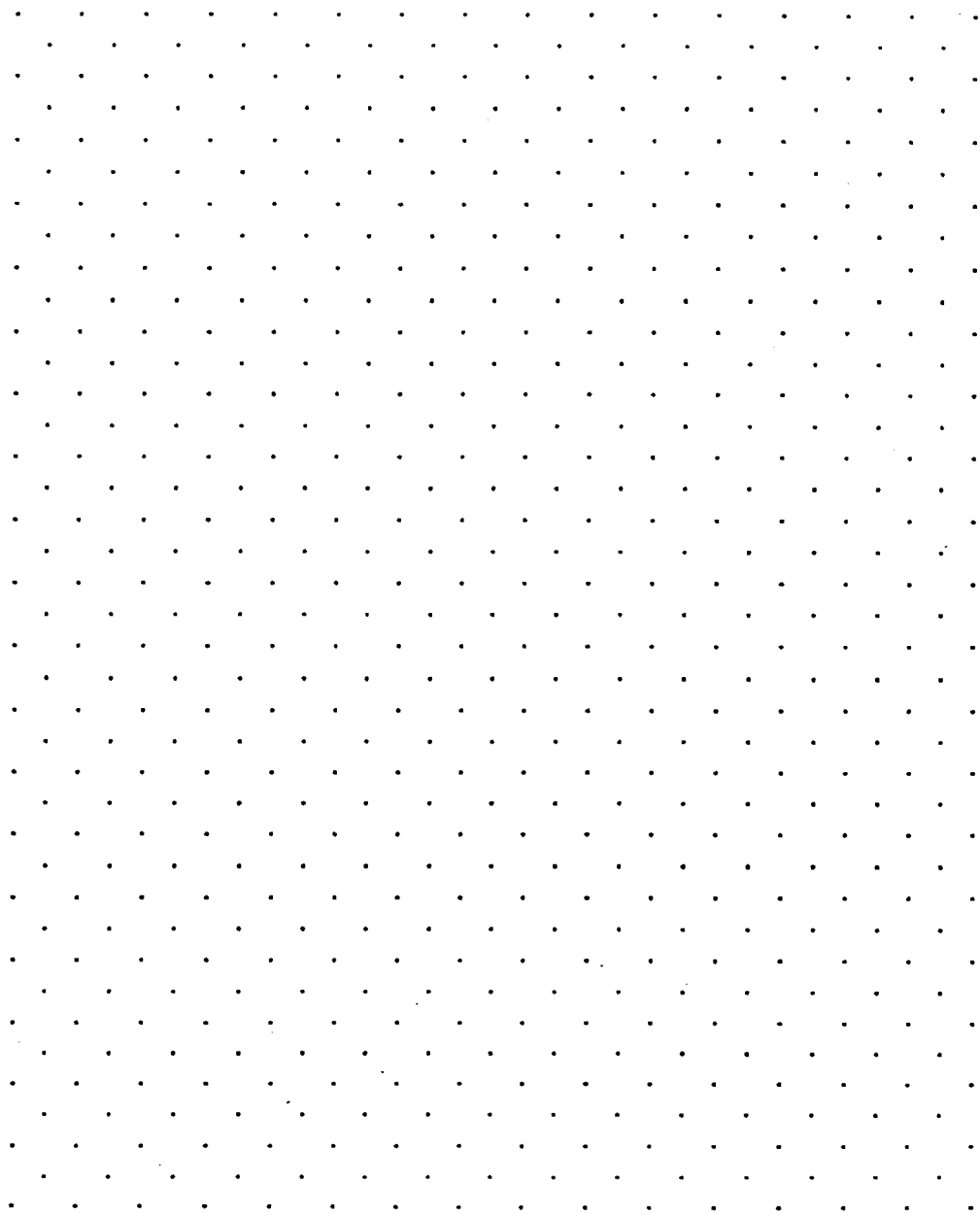
FIG. 8 is a large regional view of FIG. 7.

FIG. 7 shows a lighting-up pattern obtained by regularly omitting some lit-up pixels from the first standard lighting-up pattern shown in FIG. 3 at the ratio of ¾. It is clearly understood that the screen angle θ is substantially equal to 45° in the lighting-up pattern of FIG. 7 and that the screen ruling thereof is twice as large as the screen ruling of the first standard halftone pattern shown in FIG. 3. FIG. 8 is a large regional view of FIG. 7.

The lighting-up pattern shown in FIGS. 7 and 8 is obtained by regularly omitting some original isolated points when the tone level of the image signal is approximately 1/M. This lighting-up pattern also has the screen structure of a significantly different periodicity from that of the original first standard lighting-up pattern shown in FIG. 3.

Figure 9:
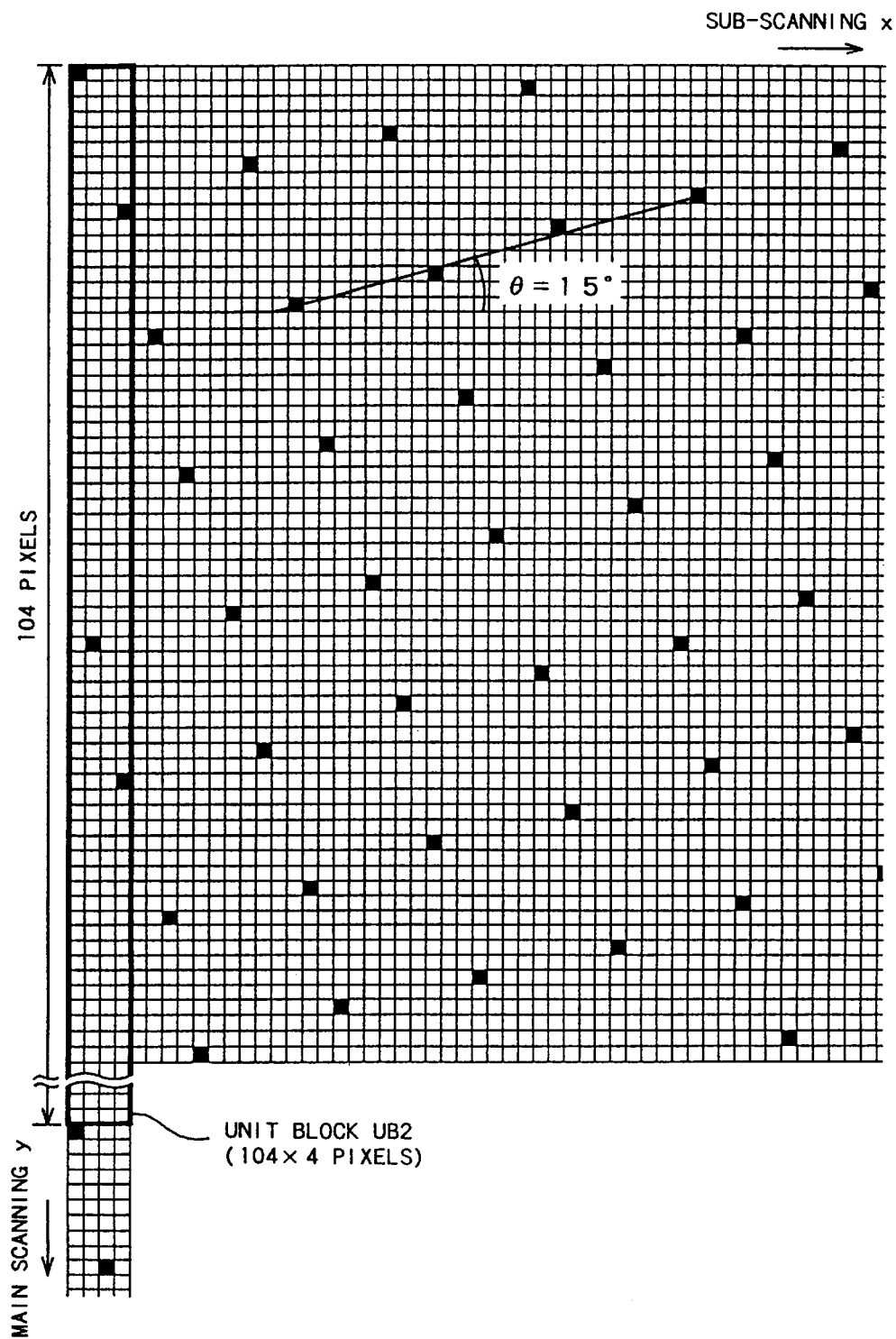
FIG. 9 shows a second standard lighting-up pattern, in which one pixel is lit up in each one-dot area.
Figure 10:
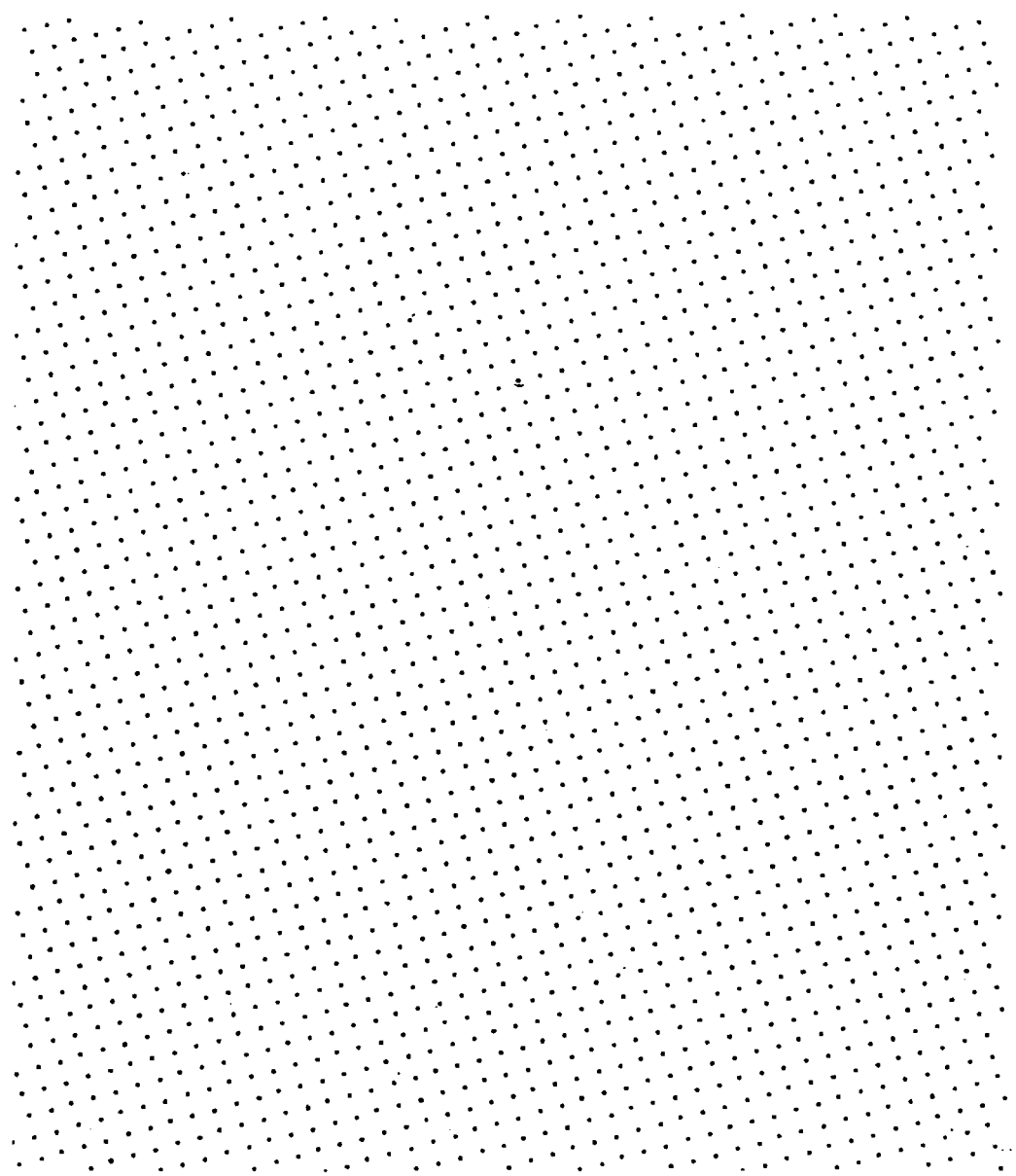
FIG. 10 is a large regional view of FIG. 9.

FIG. 9 shows a lighting-up pattern where one pixel is lit up in each one-dot area while using a unit block UB2 having a screen angle θ of approximately 15°. This pattern will be hereinafter referred to as second standard lighting-up pattern. The unit block UB2 has a size of 104×4 pixels and includes five one-dot areas. Each one-dot area accordingly includes (104×4)/5=83.2 pixels. The halftone dot pitch is thus given as √83.2≈9.12 pixels. When the output resolution is assumed to be 1500 dpi, the exact screen ruling in the lighting-up pattern of FIG. 9 is given as 1500/9.12≈164 [lpi]. The first standard lighting-up pattern shown in FIG. 3 and the second standard lighting-up pattern shown in FIG. 9 have substantially identical one-dot area size and screen ruling, and thus represent equivalent patterns having different screen angles. FIG. 10 is a large regional view showing the lighting-up pattern of FIG. 9 over a wider area.

The lighting-up pattern shown in FIG. 9 is obtained by repeatedly arranging the unit block UB2 in such a manner that the positions of the adjoining unit blocks UB2 are shifted from each other by 21 pixels in a sub-scanning direction x.

Figure 11:
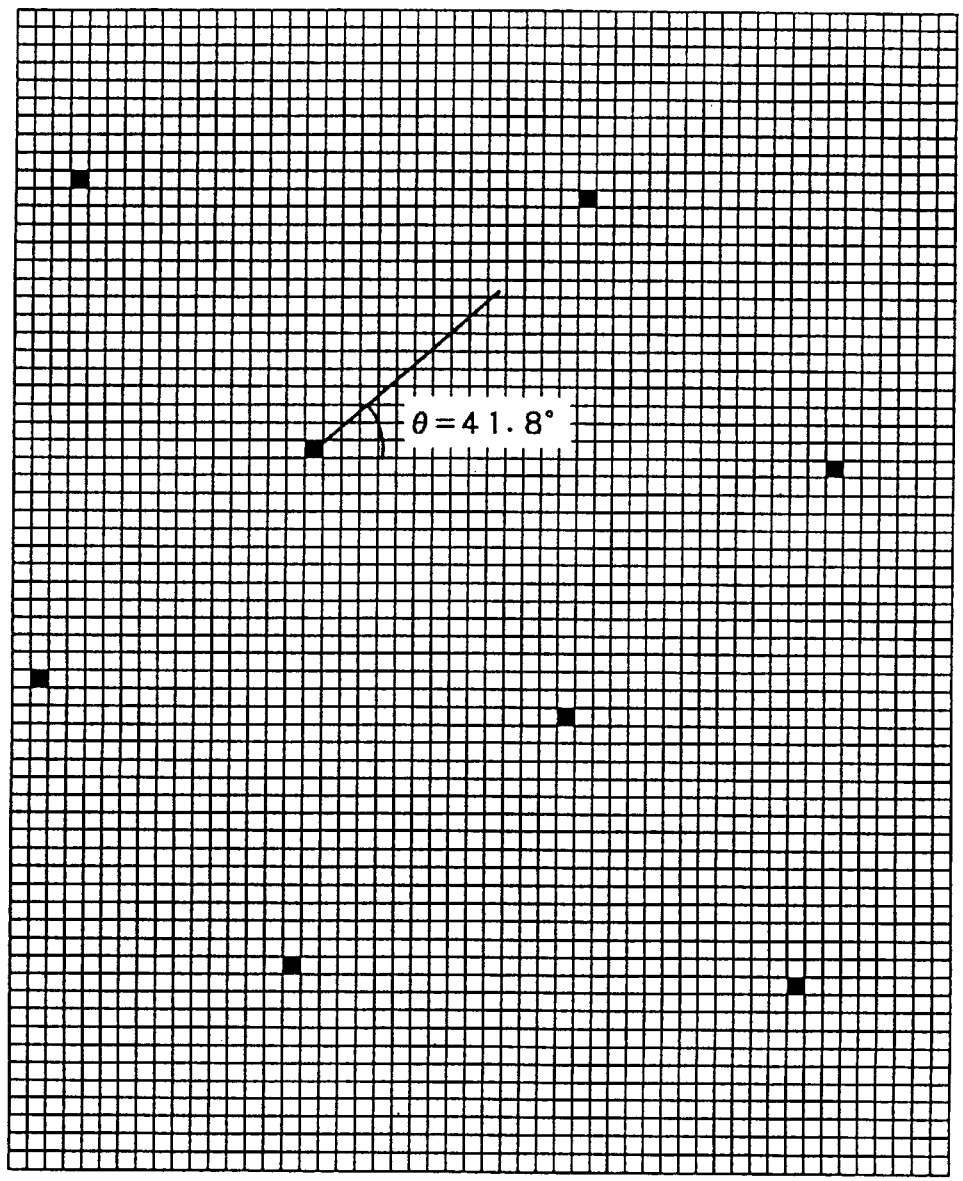
FIG. 11 shows a lighting-up pattern obtained by omitting lit-up pixels from the second standard lighting-up pattern at the ratio of four pixels per five one-dot areas.
Figure 12:
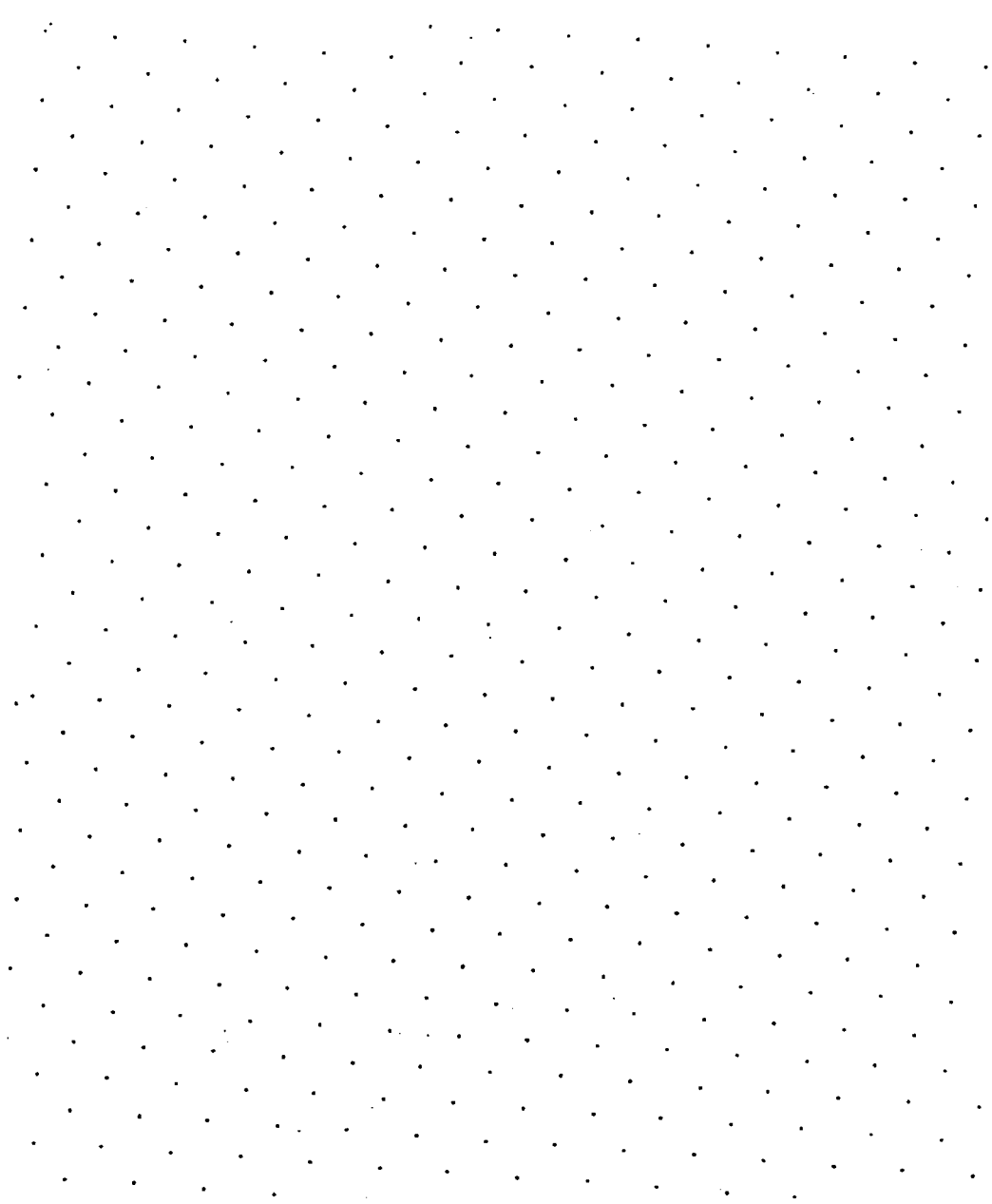
FIG. 12 is a large regional view of FIG. 11.

FIG. 11 shows a lighting-up pattern obtained by regularly omitting some lit-up pixels from the second standard lighting-up pattern shown in FIG. 9 at the ratio of ⅘. In the pattern of FIG. 11, the screen angle θ is substantially equal to 41.80° and the screen ruling is √5 times as large as the screen ruling of the second standard halftone pattern shown in FIG. 9. FIG. 12 is a large regional view of FIG. 11.

The lighting-up pattern shown in FIGS. 11 and 12 is obtained by regularly omitting some original isolated points shown in FIGS. 9 and 10 when the tone level of the image signal is approximately 1/M. This lighting-up pattern has the screen structure of a significantly different periodicity from that of the original second standard lighting-up pattern.

As discussed above, when a desired number of tones M are reproduced by a set of plural one-dot areas with a low density of output scanning lines, regular omission of the original isolated dots from the plurality of halftone dots significantly changes the periodicity of the screen structure of the original lighting-up pattern. Such a significant change in the periodicity of the screen structure causes a problem especially when a plurality of halftone dot images are laid one upon another to reproduce a color print as discussed below.

Figure 13:
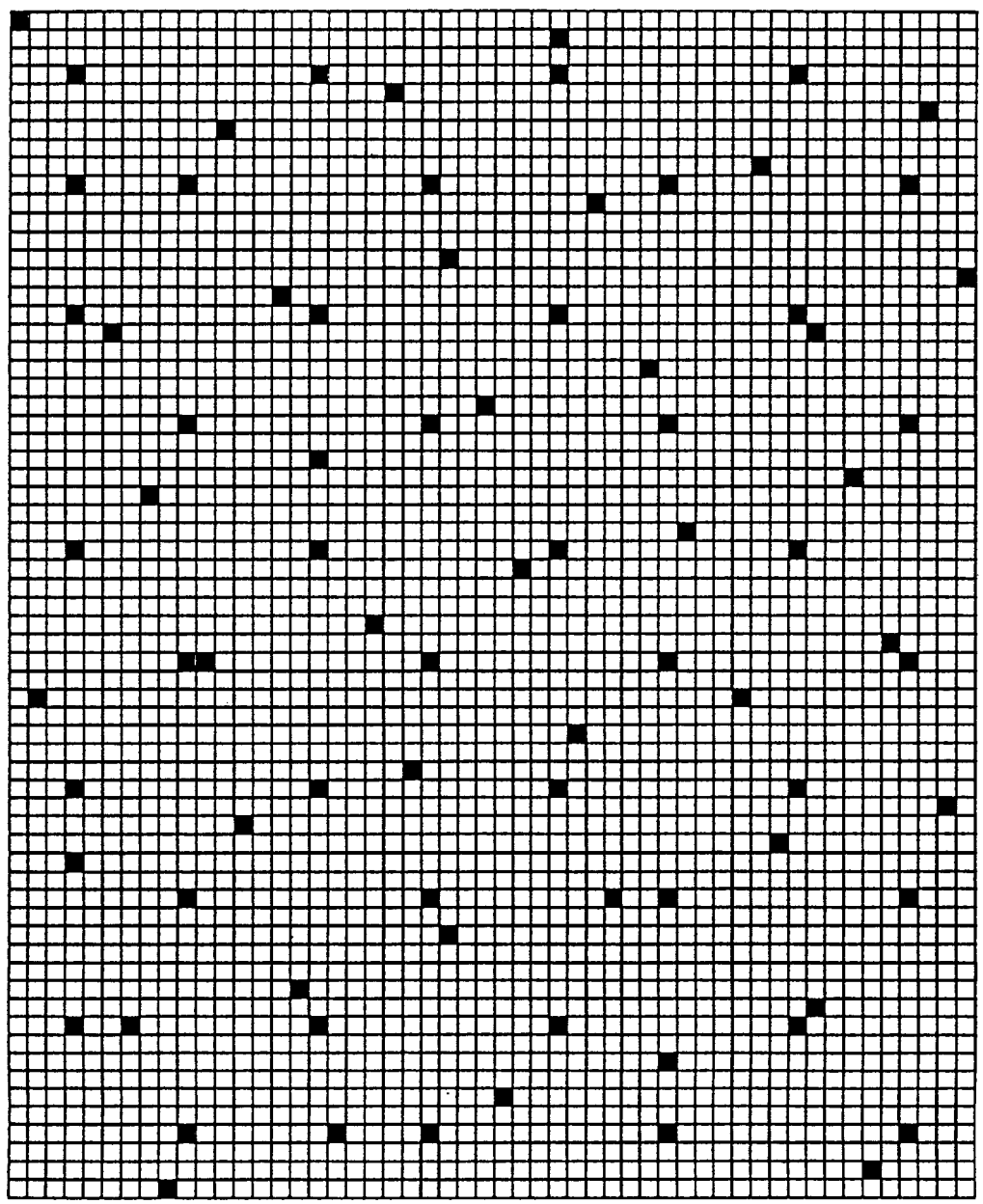
FIG. 13 shows a lighting-up pattern obtained by laying the lighting-up patterns of FIGS. 3 and 9 one over the other.
Figure 14:
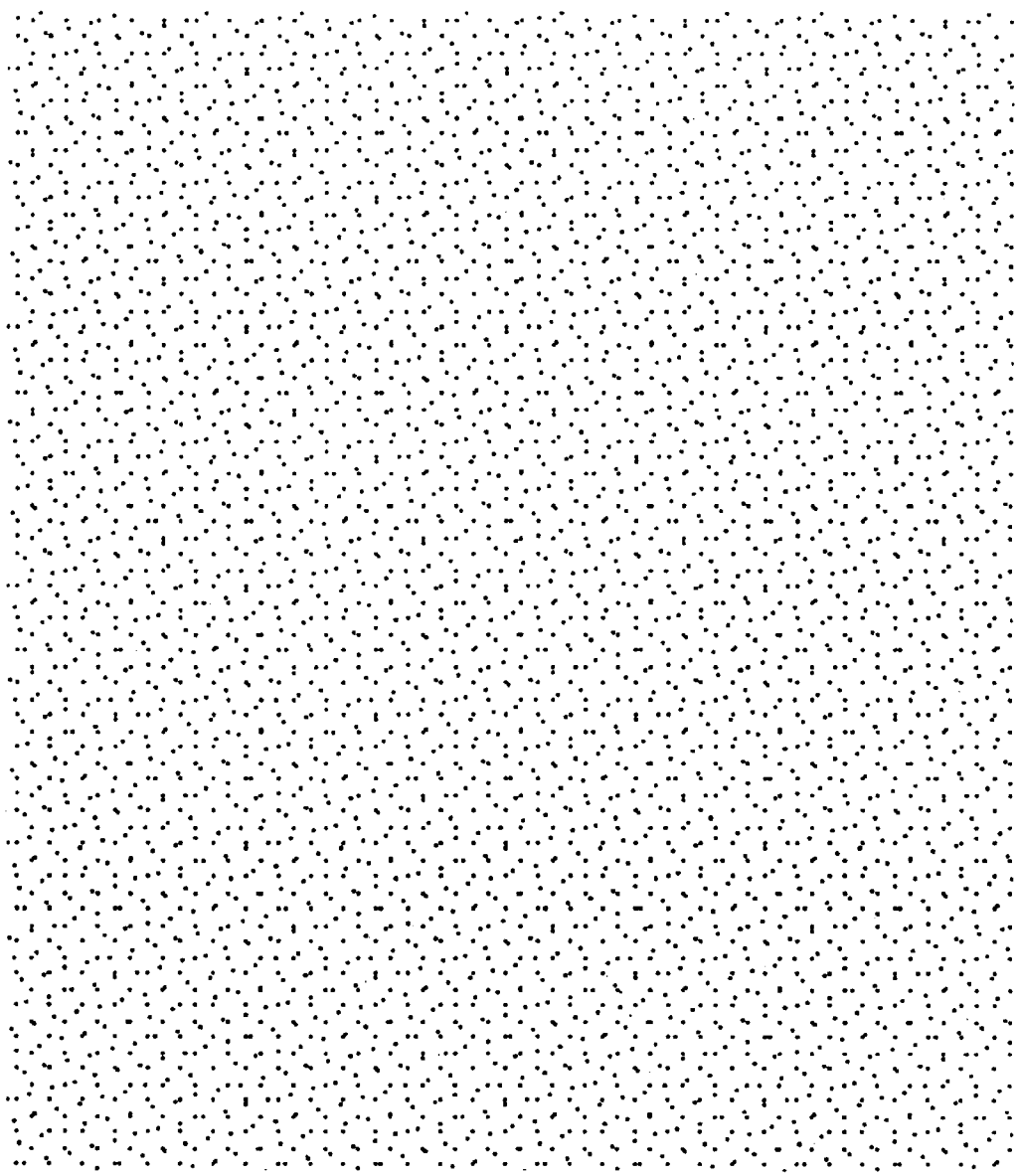
FIG. 14 is a large regional view of FIG. 13.

FIG. 13 shows a lighting-up pattern obtained by laying the first standard lighting-up pattern of FIG. 3 and the second standard lighting-up pattern of FIG. 9 one over the other. FIG. 14 is a large regional view of FIG. 13. These standard lighting-up patterns have substantially identical screen rulings, 163 [lpi] and 164 [lpi], and the screen angles thereof are 45° and 15°. It is generally known that the screen angle difference of about 30° prevents moires in a printed image. As clearly shown in FIG. 14, no moires over a wide area are observed when these standard lighting-up patterns are laid one over the other.

Figure 15:
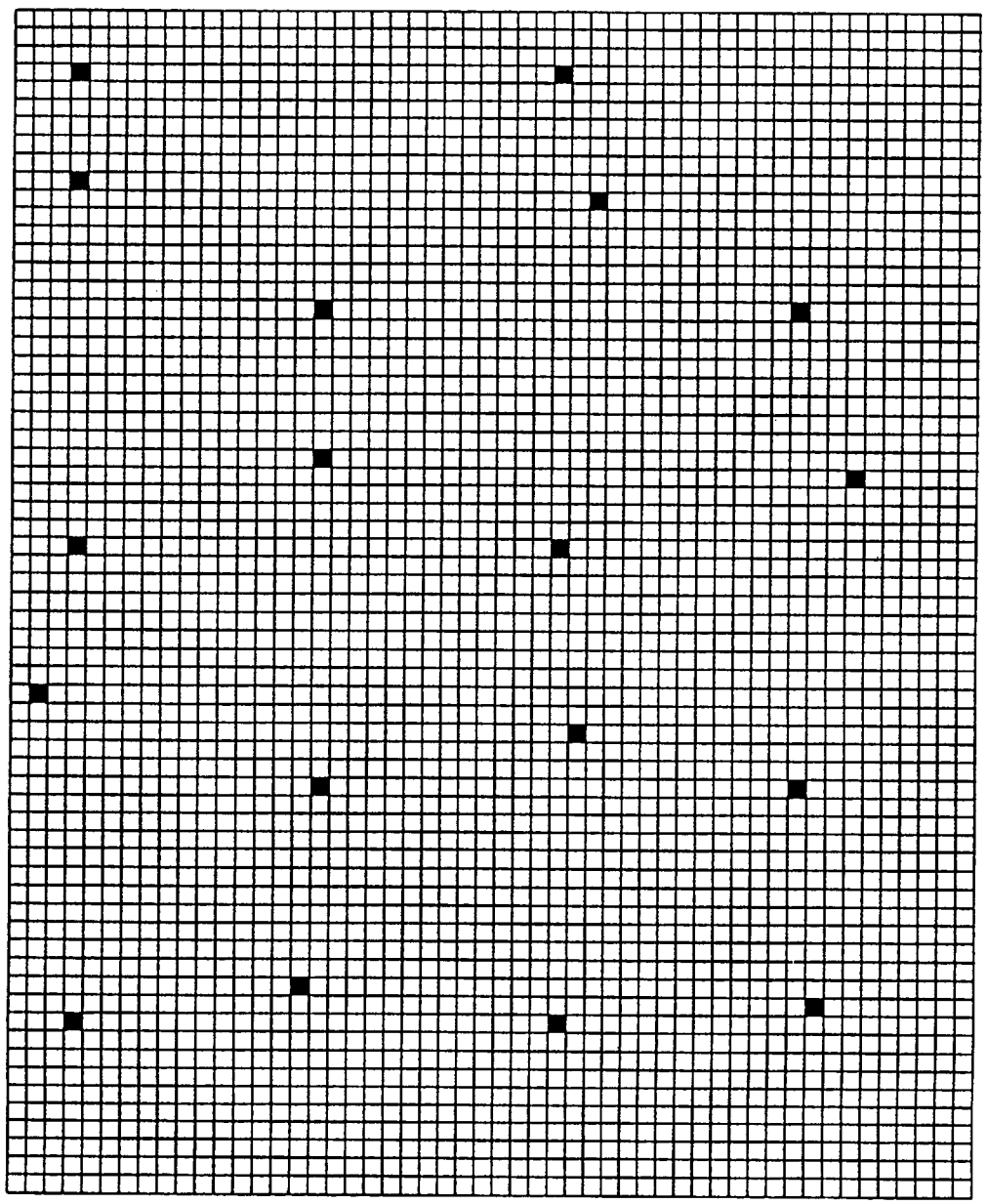
FIG. 15 shows a lighting-up pattern obtained by laying the lighting-up patterns of FIGS. 7 and 11 one over the other.
Figure 16:
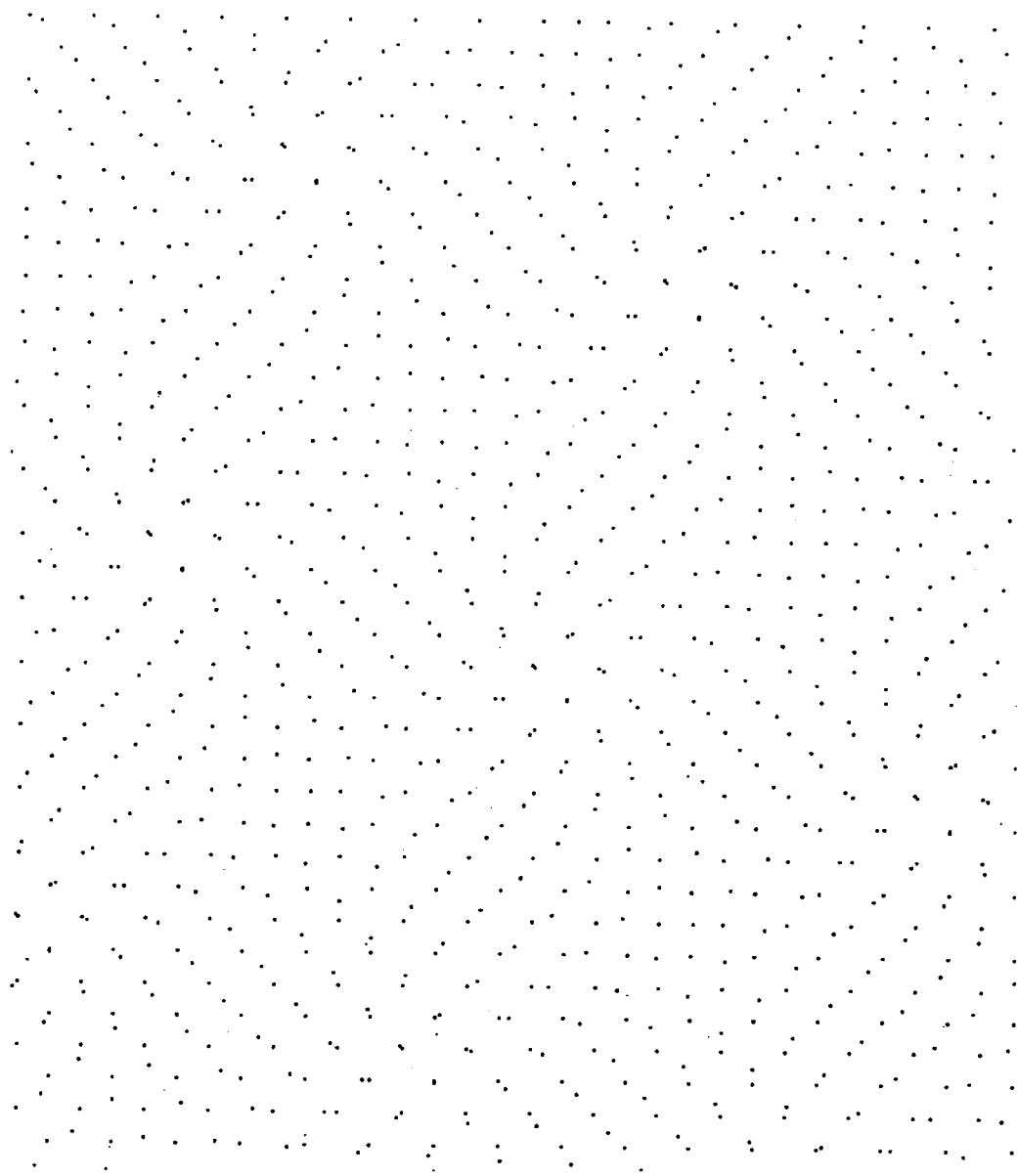
FIG. 16 is a large regional view of FIG. 15.

FIG. 15 shows a lighting-up pattern obtained by laying the lighting-up patterns of FIGS. 7 and 11 one over the other. FIG. 16 is a large regional view of FIG. 15. As described before, the lighting-up pattern of FIG. 7 is obtained by regularly omitting some lit-up pixels from the first standard pattern at the ratio of ¾, whereas the lighting-up pattern of FIG. 11 is obtained by regularly omitting some lit-up pixels from the second standard pattern at the ratio of ⅘. Observation of FIG. 16 proves that moires having a size of several halftone dots occur when these halftone dot images are laid one over the other.

FIG. 17 is a graph showing wave number vectors related to the moires in the pattern of FIG. 16. The wave number vectors denotes a vector whose length is equal to the reciprocal of a cycle of a repeated pattern and whose direction is equivalent to a direction defined by the screen angle θ. In the screen pattern, the 'reciprocal of a cycle of the repeated pattern' is equal to the screen ruling. The 'direction equivalent to that defined by the screen angle θ' includes various directions defined by the sum of the screen angle θ and any integral multiple of 90°. When three wave number vectors V3, V9, and $V_{75°}$ form a closed loop as shown in FIG. 17(A), no secondary moiré is observed. The secondary moiré is defined to be a moiré which occurs when three lighting-up patterns are laid one upon another. The vector V3 is a wave number vector in the first standard lighting-up pattern shown in FIG. 3, and the vector V9 is a wave number vector in the second standard lighting-up pattern shown in FIG. 9. The third vector $V_{75°}$ is a wave number vector in a lighting-up pattern whose screen ruling is substantially equal to that of the standard lighting-up pattern and whose screen angle θ is 75°.

Vectors V7 and V11 encircled in the drawings of FIGS. 17(A) and 17(B) are wave number vectors for the lighting-up patterns of FIGS. 7 and 11, which are laid one over the other in FIGS. 15 and 16. A difference vector Vm (see FIG. 17(B)) between these vectors V7 and V11 accordingly represents a wave number vector for the moires of FIGS. 15 and 16. The length of the wave number vector is equal to the reciprocal of its repeating cycle. The smaller value of the wave number vector Vm for the moires lengthen the repeating cycle of the moires, whereby the moires cover the wider area. When there is a small difference between the wave number vectors V7 and V11 of the two overlapped lighting-up patterns as shown in FIG. 17(B), the wave number vector Vm for the moires is small and the moires thereby become conspicuous.

As described above, when the lighting-up patterns whose original isolated dots are regularly omitted are laid one upon another in order to reproduce a desired number of tones M by a set of plural halftone dots, the image tends to cause moires over a wide area.

FIG. 18 show lighting-up patterns of 3×3 array of one-dot areas at some image signal levels. The straight line in the center of FIG. 18 represents the level of an input image signal Im, which is assumed here to have a minimum value of 0 and a maximum value of 255.

When the level of the input image signal Im is equal to zero, no lit-up pixels are formed as shown in FIG. 18(A). When the level of the input image signal Im is equal to a predetermined lower threshold N1, on the other hand, one halftone dot consisting of one pixel is formed in each one-dot area as shown in FIG. 18(C). In case that the level of the input image signal Im satisfies 0<Im<N1, an irregular pattern with some lit-up pixels irregularly omitted from the lighting-up pattern of FIG. 18(C) is formed as shown in FIG. 18(B). The omission of some of the lit-up pixels increases the number of tones to be expressed by a set of plural one-dot areas. More concretely, there are eight intermediate patterns having different tones between the pattern of FIG. 18(A) and that of FIG. 18(C), whereas there are no intermediate patterns if the lit-up pixels may not be omitted partly. The 'irregularity of omission' prevents moires in a wide area as described before.

In case that the level of the input image signal Im exceeds the lower threshold N1, a halftone dot in each one-dot area expands with a rise in the level of the input image signal Im, like the conventional halftone dots. Especially when the level of the input image signal Im is equal to 127, which is a median of the image signal level, tidy halftone dots having a halftone dot area rate of about 50% are formed as shown in FIG. 18(D), as is the case with the conventional halftone dot formation.

When the level of the input image signal Im is equal to a predetermined upper threshold N2, one non-lit-up portion consisting of one pixel is formed in each one-dot area as shown in FIG. 18(E). The lit-up portions of one pixel shown in FIG. 18(C) and the non-lit-up portions of one pixel shown in FIG. 18(E) are referred to as 'isolated dots'. In case that the level of the input image signal Im is equal to 255, no non-lit-up portions are formed but every one-dot area is filled out as shown in FIG. 18(G). When the level of the input image signal Im satisfies N2<Im<255, on the other hand, an irregular pattern is formed as shown in FIG. 18(F) where some non-lit-up pixels are irregularly omitted from the lighting-up pattern of FIG. 18(E).

In this specification, the tones expressed by the input image signal Im whose level is relatively close to the minimum value '0' are referred to as 'light tones', whereas those expressed by the input image signal Im whose level is relatively close to the maximum value '255' are referred to as 'dark tones'. The range of the image signal Im satisfying 0<Im<N1 is referred to as 'extremely light tone level', and the range satisfying N2<Im<255 as 'extremely dark tone level'. The range of the image signal Im satisfying N1≦Im≦N2 is referred to as 'medium tone' or 'medium tone level'.

The lighting-up pattern in the extremely light tone level (FIG. 18(B)) and the lighting-up pattern in the extremely dark tone level (FIG. 18(F)) have the common characteristic of having 'irregularly omitted isolated dots'. The lower threshold N1 and the upper threshold N2 respectively correspond to 'first signal level in light tones' and 'first signal level in dark tones' of the claimed invention. The minimum value '0' and the maximum value '255' of the input image signal Im respectively correspond to 'second signal level in light tones' and the 'second signal level in dark tones' in the claimed invention. The lighting-up patterns of FIGS. 18(B) and 18(F) are obtained by irregularly dispersing the isolated dots, or by irregularly omitting part of the isolated dots in the first signal level when the input image signal is between the first signal level and the second signal level.

In the medium tone level of the image signal Im, which is expressed by N1≦Im≦N2, each halftone dot includes at least one lit-up pixel. The lighting-up pattern in this level is not so much different from that of the conventional halftone dots. A screen structure, which is defined by a screen angle and a screen ruling, is thus clearly observable in a halftone dot image of this medium tone level as shown in, for example, FIG. 18(D).

The following embodiments are examples of the method and apparatus for achieving the lighting-up patterns shown in FIG. 18.

B. First Embodiment

Figure 19:
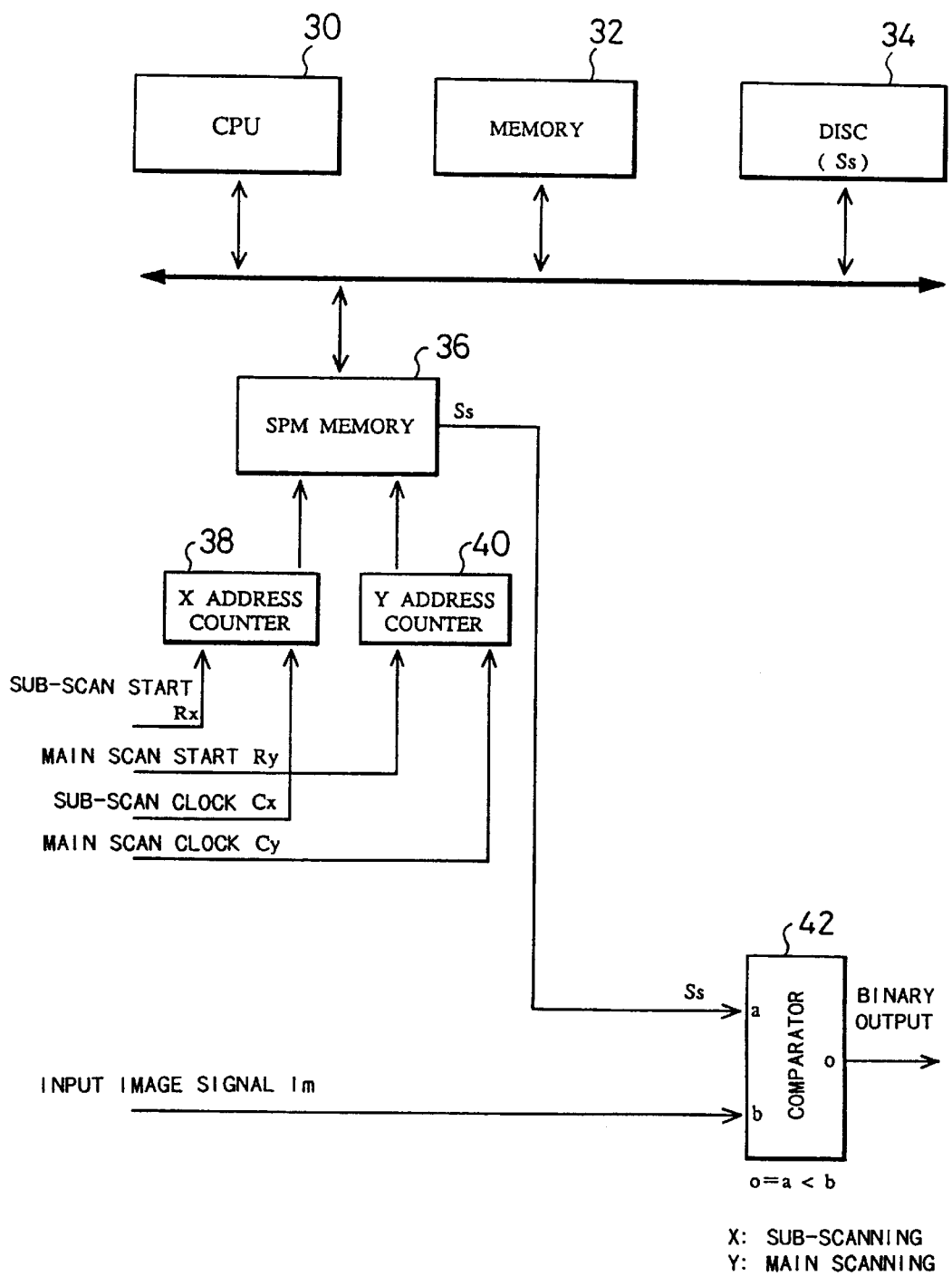
FIG. 19 is a block diagram illustrating the structure of a halftone dot generator given as a first embodiment of the present invention.

FIG. 19 is a block diagram illustrating the structure of a halftone dot generator as a first embodiment of the present invention. The halftone dot generator includes a CPU 30, a main memory (ROM and RAM) 32, a floppy disk unit 34, an SPM (Screen Pattern Memory) 36, a sub-scanning address counter 38, a main scanning address counter 40, and a comparator 42. The halftone dot generator further includes an exposure device (not shown) for recording a halftone dot image on a recording medium with a light beam. The SPM 36 stores a threshold pattern in a unit block. A plurality of threshold patterns are stored in the floppy disk unit 34, and one of the plurality of threshold patterns is selected and transferred to the SPM 36.

The SPM corresponds to threshold pattern memory of the claimed invention, and the two address counters 38 and 40 correspond to reading means of the claimed invention.

The sub-scanning address counter 38 receives a sub-scanning start signal Rx and a sub-scanning clock signal Cx. The sub-scanning start signal Rx generates one pulse when a sub-scanning coordinate of the light beam is reset to an initial position. The sub-scanning clock signal Cx generates one pulse each time when the sub-scanning coordinate of the light beam is updated. The sub-scanning address counter 38 generates the sub-scanning coordinate of the light beam within the unit block in response to these signals Rx and Cx, and supplies the sub-scanning coordinate as a sub-scanning address to the SPM 36. In a similar manner, the main scanning address counter 40 generates a main scanning coordinate of the light beam within the unit block in response to a main scanning start signal Ry and a main scanning clock signal Cy, and supplies the main scanning coordinate as a main scanning address to the SPM 36. One threshold value Ss is read from the threshold pattern stored in the SPM 36 according to the addresses given by the two address counters 38 and 40, and is supplied to the comparator 42.

The comparator 42 compares the threshold value Ss with the input image signal Im and generates a binary output data based on the result of comparison. The binary output data is also referred to as 'exposure signal' or 'halftone signal'. The level of the binary output data is defined as:

H level indicating exposure or light up when Ss<Im; and

L level indicating non-exposure or no light up when Im≦Ss.

In case that the input image signal Im is in the range of 0 to 255, the threshold value Ss ranges from 0 to 254.

Figure 28:
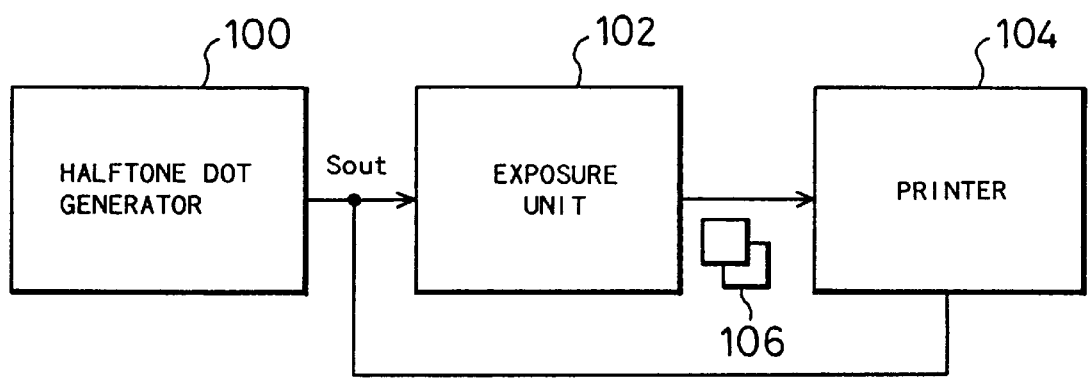
FIG. 28 is a block diagram showing the structure of a printing system.

FIG. 28 is a block diagram showing the structure of a printing system. The printing system includes the halftone dot generator 100, an exposure unit 102, and a printer 104. The exposure device 102 exposes a photosensitive recording medium, for example, a photosensitive film, with a light beam in response to the binary output data Sout, and thereby generates halftone dot images 106 of respective color separations Y, M, C, and K on the recording medium. The printer 104 reproduces a color print using the halftone dot images 106 with the respective color inks. Alternatively, a color print may be directly made with the printer in response to the binary output data Sout for the respective color separations which are supplied from the halftone dot generator 100 to the printer 104.

Figure 21:
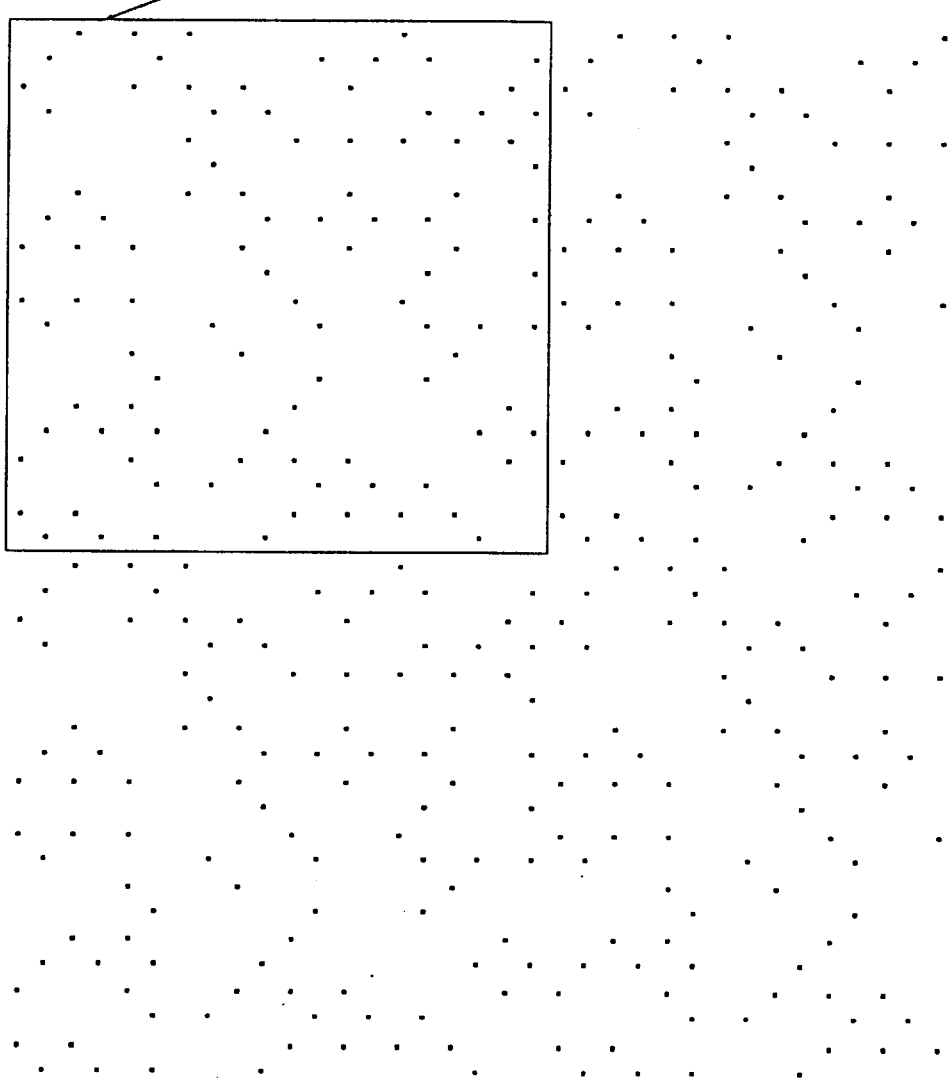
FIG. 21 shows a lighting-up pattern obtained by irregularly omitting some lit-up pixels at the ratio of ½ from the first standard lighting-up pattern.

FIG. 20 is a table showing the details of the lighting-up patterns of FIGS. 21–24 in the first embodiment. FIG. 21 shows a lighting-up pattern obtained by irregularly omitting some lit-up pixels at the ratio of ½ from the first standard lighting-up pattern shown in FIG. 3. An area defined by the solid line in the drawing of FIG. 21 represents an outline of a unit block. The threshold pattern stored in the SPM 36 is used to allocate threshold values to the respective pixels included in this unit block. The unit block includes about 200 one-dot areas. It is preferable that one unit block includes several hundreds of one-dot areas. Although the larger size of the unit block favorably enhances the irregularity, the excessively large size of the unit block is not preferable from the viewpoint of the required capacity of the SPM 36.

FIG. 21 shows an example of the available lighting-up patterns when the input image signal Im satisfies 0<Im<N1. The pattern of FIG. 21 is a concrete example of the lighting-up pattern shown in FIG. 18(B) discussed above. When the level of the input image signal Im is equal to the lower threshold N1, one lit-up portion consisting of one pixel is formed in each one-dot area (FIG. 18(C)). A further increase in level of the input image signal Im makes each halftone dot to have a plurality of pixels, instead of one isolated dot consisting of one pixel.

The lighting-up pattern obtained when the input image signal Im is in the extremely dark tone level (N2<Im<255) has isolated dots of non-lit-up pixels irregularly dispersed in a similar manner to FIG. 21. In the medium tone level, the screen structure defined by the screen angle and the screen ruling is clearly observable as illustrated in FIG. 18(D).

A concrete threshold pattern for achieving the lighting-up pattern as shown in FIG. 21 can readily be made by those having ordinary skill in the art from the characteristics of the lighting-up patterns discussed above and is thus not specifically described here.

Figure 22:
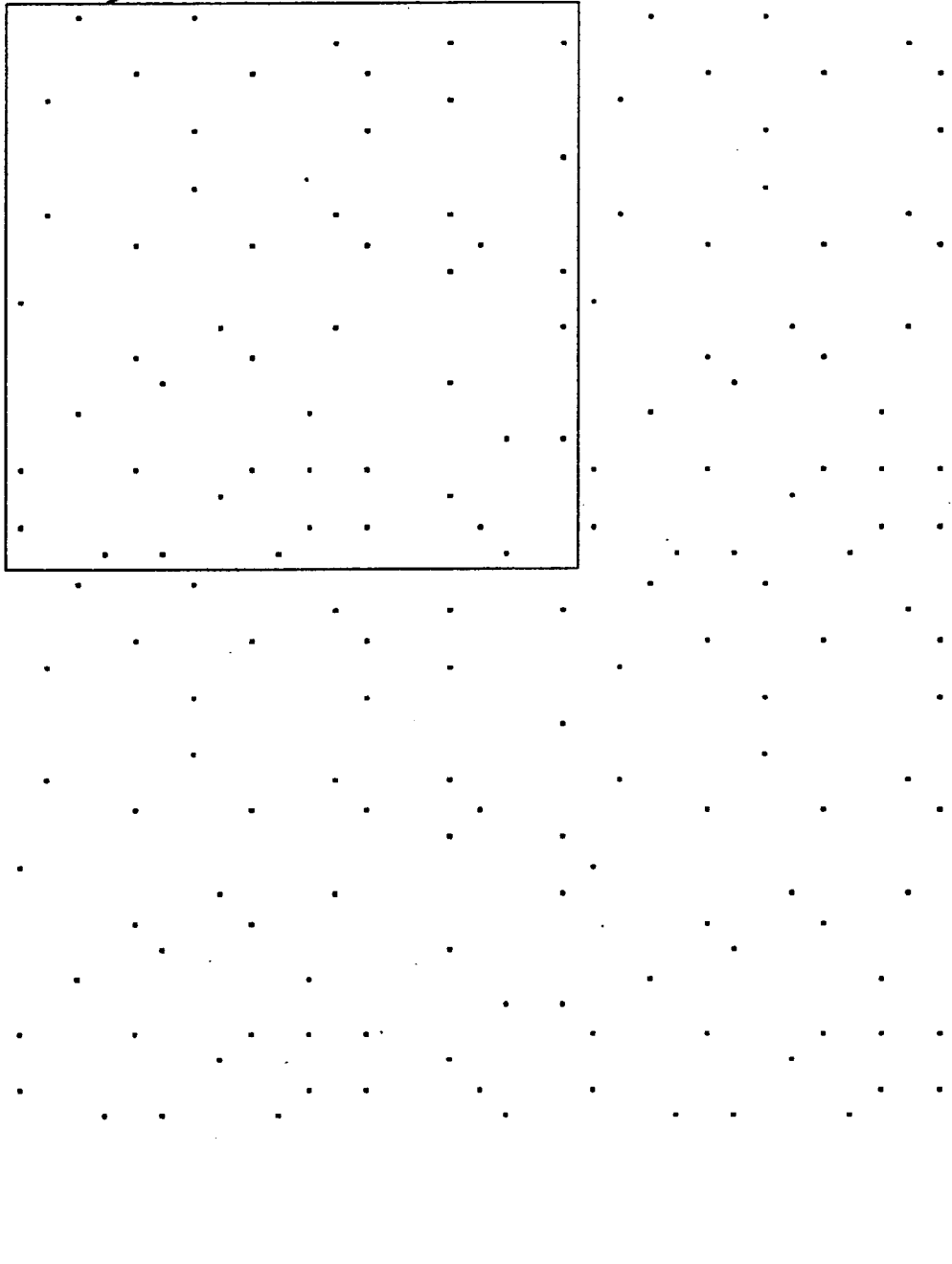
FIG. 22 shows a lighting-up pattern obtained by irregularly omitting some lit-up pixels at the ratio of ¾ from the first standard lighting-up pattern.
Figure 23:
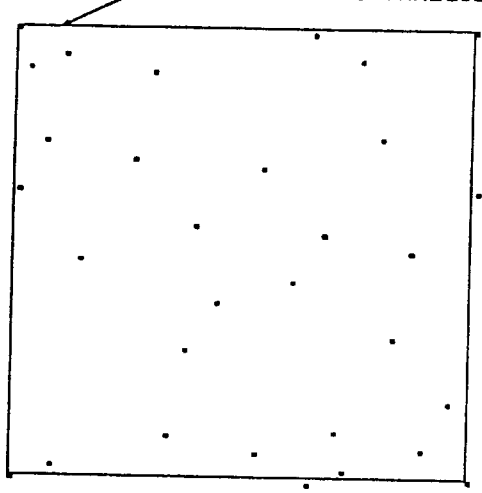
FIG. 23 shows a lighting-up pattern obtained by irregularly omitting some lit-up pixels at the ratio of ⅘ from the second standard lighting-up pattern.

FIG. 22 shows a lighting-up pattern obtained by irregularly omitting some lit-up pixels at the ratio of ¾ from the first standard lighting-up pattern shown in FIG. 3. FIG. 23 shows a lighting-up pattern obtained by irregularly omitting some lit-up pixels at the ratio of ⅘ from the second standard lighting-up pattern shown in FIG. 9.

Figure 24:
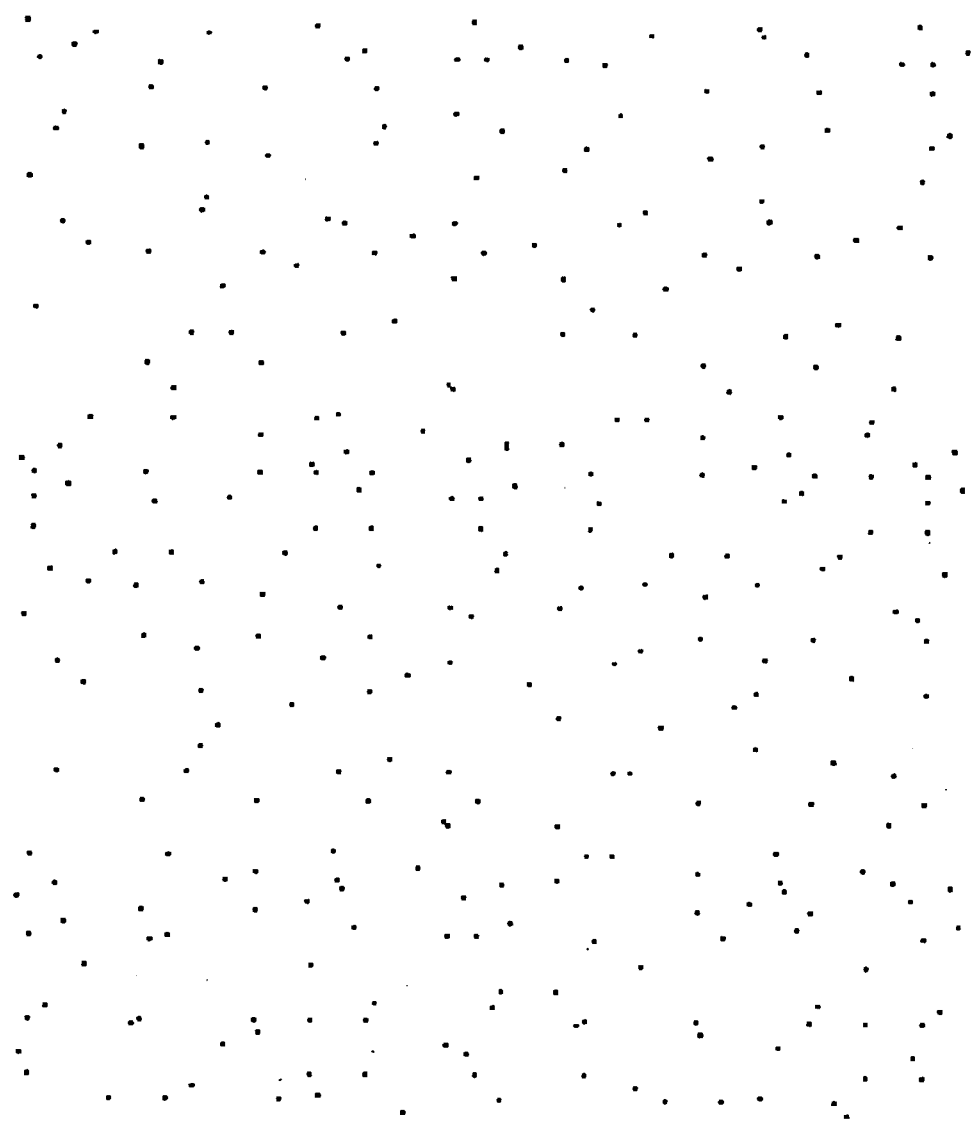
FIG. 24 shows a lighting-up pattern obtained by laying the lighting-up patterns of FIGS. 22 and 23 one over the other.

FIG. 24 shows a lighting-up pattern obtained by laying the lighting-up patterns of FIGS. 22 and 23 one over the other. FIG. 24 corresponds to FIG. 16 discussed above, as clearly understood from the comparison between the tables of FIG. 20 and FIG. 2. Unlike the example shown in FIG. 16, no moires are observed in the overlapped lighting-up patterns of FIG. 24. This is ascribed to the irregular dispersion of the non-lit-up pixel positions in the lighting-up patterns of FIGS. 22 and 23. The lighting-up patterns of FIGS. 22 and 23 accordingly do not have the characteristic of generating a screen structure different from the original screen structure due to the omission of the lit-up pixels, which has been explained with the drawings of FIGS. 3 through 12. This can be explained with wave number vectors. In the lighting-up patterns of FIGS. 22 and 23, since the non-lit-up pixel positions are irregularly dispersed, no wave number vectors corresponding to the wave number vectors V7 and V11 shown in FIG. 17 are established and no moiré wave number vector Vm is thereby generated as their difference. No generation of the moiré wave number vector Vm implies no generation of moires in the image.

C. Second Embodiment

Figure 25:
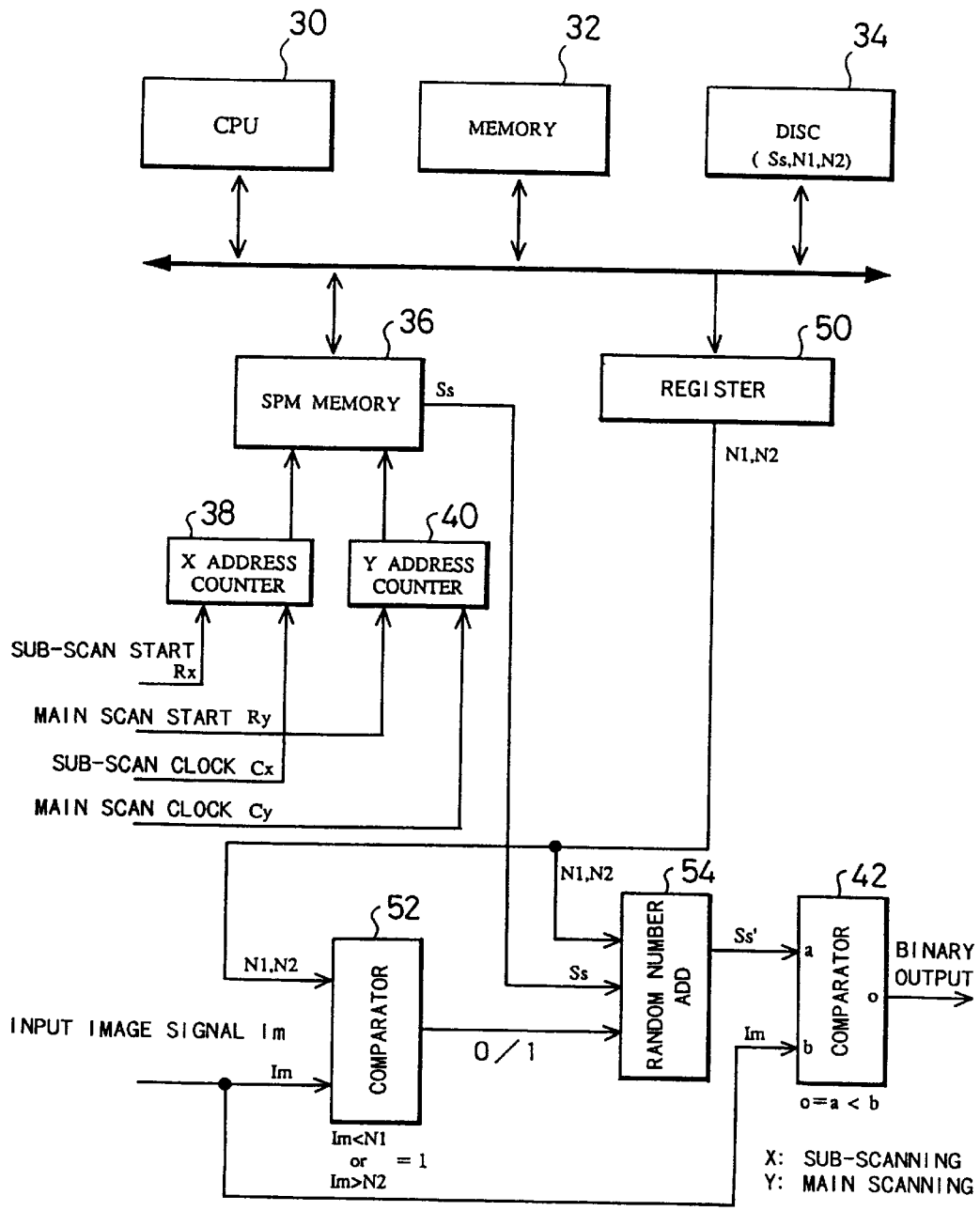
FIG. 25 is a block diagram illustrating the structure of a halftone dot generator as a second embodiment according to the present invention.

FIG. 25 is a block diagram illustrating the structure of a halftone dot generator as a second embodiment according to the present invention. The halftone dot generator of the second embodiment includes an upper/lower threshold register 50 for tone interpolation, a tone interpolation decision unit 52 for input image values, and a random number allocating unit 54 for threshold values, in addition to the constituents shown in FIG. 20. The upper/lower threshold register 50 stores a lower threshold N1 and an upper threshold N2 for tone interpolation, which are read from the floppy disk unit 34.

The upper/lower threshold register 50, the tone interpolation decision unit 52, and the random number allocating unit 54 correspond to threshold value modification means or threshold value interpolating means of the claimed invention.

The halftone dot generator shown in FIG. 25 modifies the threshold values Ss with random numbers in order to irregularly disperse the positions of the lit-up pixels to be omitted in the range of the extremely light tone level (that is, 0<Im<N1) and irregularly disperse the positions of the non-lit-up pixels to be omitted in the range of the extremely dark tone level (that is, N2<Im<255). In order to achieve such dispersion, threshold values of 0, N1, N1+1, N1+2, ..., N2−1, N2, and 254 are allocated to the threshold pattern stored in the SPM 36. Namely no threshold values exist in the range of 1 to (N1−1) and the range of (N2+1) to 253.

The threshold values in the range of 1 to (N1−1) are replaced with the minimum threshold value of '0' in the threshold pattern. The number N0 of the minimum threshold values '0' is given by the following Equation (4):

$$N0 = Mp \times (N1-1)/255 \quad (4)$$

wherein Mp denotes the total number of pixels included in one unit block.

The threshold values in the range of (N2+1) to 253 are replaced with the maximum threshold value of '254' in the threshold pattern. The number N254 of the maximum threshold values '254' is given by the following Equation (5):

$$N254 = Mp \times (N2-1)/255 \quad (5)$$

The lower threshold N1 and the upper threshold N2 are supplied from the upper/lower threshold register 50 to the tone interpolation decision unit 52 and the random number allocating unit 54. The tone interpolation decision unit 52 is a window comparator and outputs a tone interpolation signal to the random number allocating unit 54. The tone interpolation signal has the level '1' when the input image signal Im satisfies either 0<Im<N1 or N2<Im<255. The tone interpolation signal has the level '0', on the other hand, when the input image signal Im is in the medium tone level of N1≦Im≦N2. The random number allocating unit 54 does not carry out the tone interpolation but directly transfers the threshold value Ss read from the SPM 36 to the comparator 42 when the tone interpolation signal has the level '0'. In other words, the comparator 42 compares the threshold value Ss read from the SPM 36 directly with the input image signal Im and generates the binary output data, when the input image signal Im satisfies N1≦Im≦N2.

When the tone interpolation signal has the level '1', that is, when the input image signal Im satisfies either 0≦Im<N1 or N2<Im≦255, on the other hand, the random number allocating unit 54 modifies the threshold value Ss read from the SPM 36 and generates a modified threshold value Ss'.

By way of example, when the input image signal Im satisfies 0≦Im<N1, the modified threshold value Ss' is generated according to the following logic:

{Ss'=rand(N1) when the original threshold value Ss is equal to 0}.

wherein rand(N1) denotes a random number integer in the range of 0 to (N1−1). As discussed previously, the threshold pattern stored in the SPM 36 includes N0 pieces of the threshold values '0'. The number N0 of the threshold values '0' are modified according to the above logic, and the modified threshold values Ss' in the range of 0 to (N1−1) are generated in an irregular manner accordingly. The comparator 42 receives the modified threshold values Ss'; compares each modified threshold value Ss' with the input image signal Im; and generates the binary output data.

When the input image signal Im satisfies N2<Im≦255, on the other hand, the modified threshold value Ss' is generated according to the following logic:

{Ss'=Ss−rand(255−N2) when the original threshold value Ss is equal to 254}.

As a result, the modified threshold values Ss' in the range of (N2+1) to 254 are generated in an irregular manner. The comparator 42 receives the modified threshold values Ss'; compares each modified threshold value Ss' with the input image signal Im; and generates the binary output data.

As discussed above, the halftone dot generator shown in FIG. 25 modifies the threshold values Ss in order to disperse the isolated dots in an irregular manner in the ranges of 0≦Im<N1 and N2<Im≦255. The first range of 0≦Im<N1 is between a level of Im=0 at which any isolated lit-up dots are formed and another level of Im=N1 at which one isolated lit-up dot is formed in each one-dot area. The second range of N2<Im≦255 is between a level of Im=N2 at which one isolated non-lit-up dot is formed in each one-dot area and another level of Im=255 at which any isolated non-lit-up dots are formed. In other words, the halftone dot generator modifies the threshold values in the ranges of the image signal from a first signal level at which one isolated dot is formed to a second signal level at which any isolated dots are formed.

The functions of the respective elements 36 through 54 in the halftone dot generator of FIG. 25 may be implemented by computer programs that are stored in the main memory 32 and executed by the CPU 30. The computer programs may be store on a computer readable storage medium such as floppy disks and CD-ROMs, and transferred to another external storage device or the main memory 32 of the computer system. Alternatively the computer programs may be supplied from a program supply apparatus to the computer system via a communication lines.

Like the first embodiment, the halftone dot generator shown in FIG. 25 irregularly disperses the isolated dots, and thereby prevents moires from occurring due to the omission of the isolated dots when a plurality of halftone dot images are laid one upon another.

Figure 26:
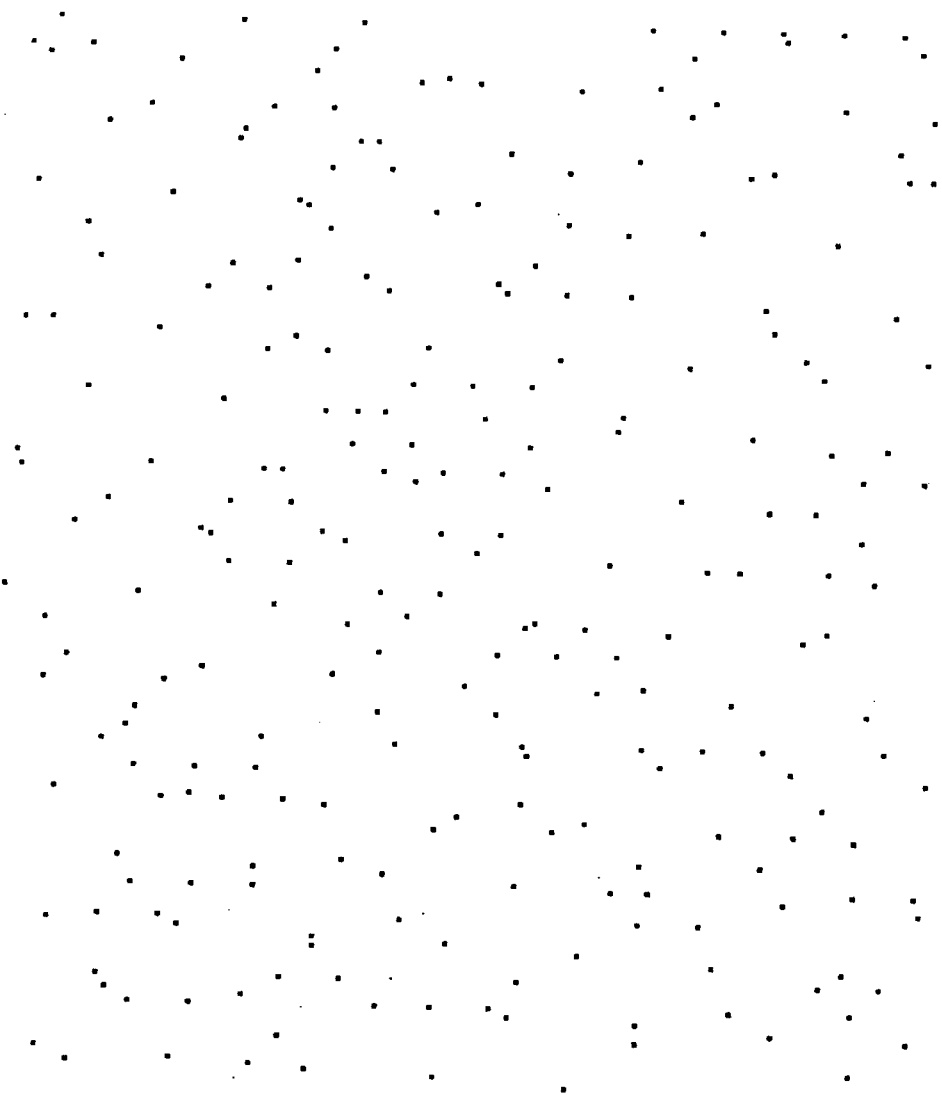
FIG. 26 shows an example of available lighting-up patterns in the second embodiment.

In the second embodiment, not all but some of the plural halftone dot images for one color print may be produced by omitting some isolated dots in a regular manner. FIG. 26 shows an example of the available lighting-up patterns in the second embodiment. The lighting-up pattern of FIG. 26 is obtained by laying the pattern of θ=45° shown in FIG. 20 and another pattern of θ=15°. The pattern of θ=45° is formed by 'regularly' omitting lit-up pixels from the first standard lighting-up pattern of FIG. 3 at the ratio of ¾. The pattern of θ=15° is formed by 'irregularly' omitting lit-up pixels from the second standard lighting-up pattern of FIG. 9 at the ratio of ⅘ by the halftone dot generator of FIG. 25. Unlike the pattern of FIG. 16, no moires are observed in the pattern of FIG. 26.

Figure 27:
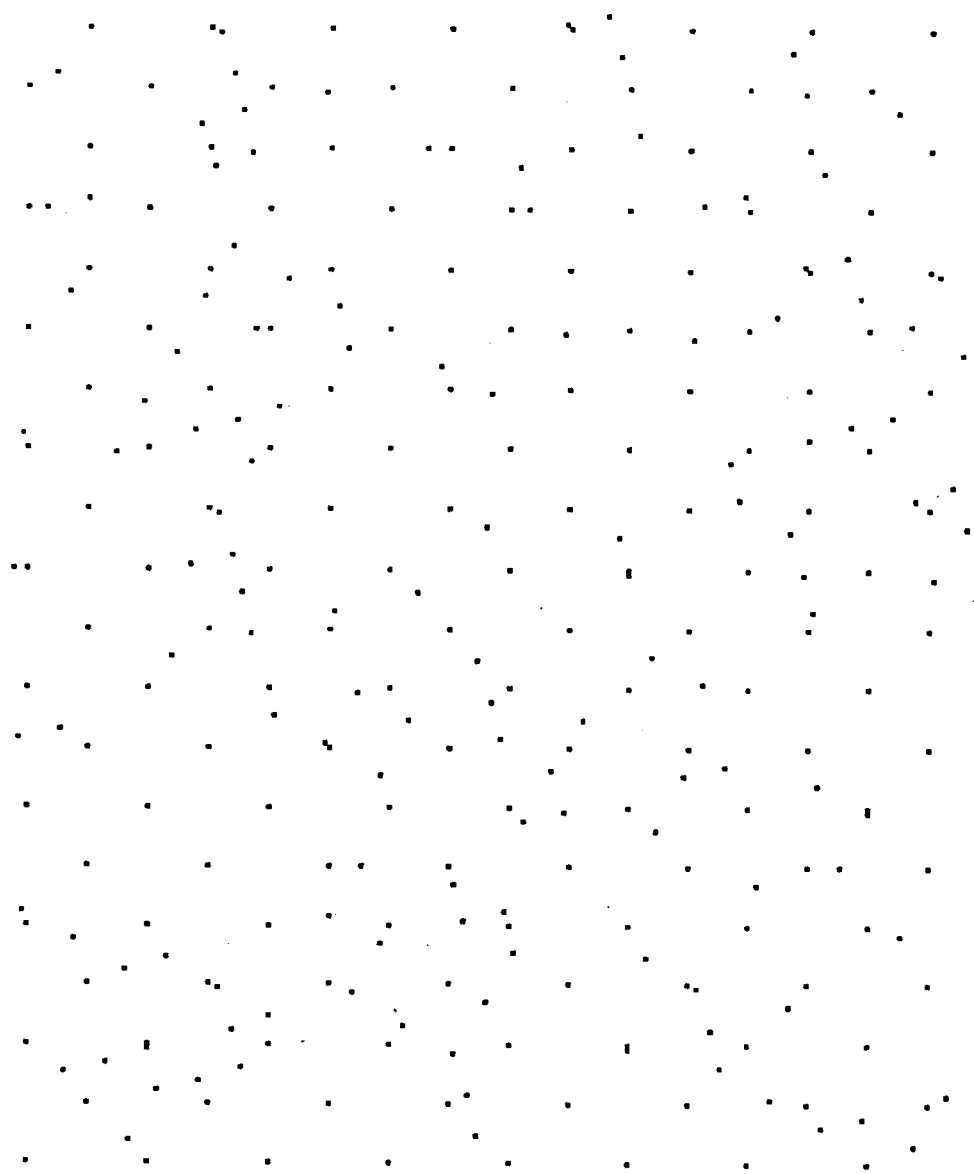
FIG. 27 shows another example of the available lighting-up patterns in the second embodiment.

FIG. 27 shows another example where the 'regular lighting-up pattern' and the 'irregular lighting-up pattern' of FIG. 26 are exchanged. Namely the lighting-up pattern of FIG. 27 is obtained by laying the pattern which is formed by 'irregularly' omitting lit-up pixels from the standard lighting-up pattern of θ=45° at the ratio of ¾ over the pattern which is formed by 'regularly' omitting lit-up pixels from the standard lighting-up pattern of θ=15° at the ratio of ⅘. In the example of FIG. 27, no moires are observed due to the overlapping of the halftone dot images.

As discussed above, the moires as shown in FIG. 16 can be alleviated effectively by irregularly dispersing the isolated dots in one of the plural lighting-up patterns that are laid one upon another.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating halftone dots in a plurality of one-dot areas in a halftone dot image for use in color printing in response to an image signal, said one-dot area being an area in which one halftone dot is to be formed, said method comprising the steps of:

(a) providing threshold values to make isolated dots in the halftone dot image to be dispersed in an irregular manner when a level of said image signal is between a first signal level and a second signal level, said isolated dots being halftone dots each consisting of one pixel separated from other halftone dots, said first signal level being a level at which one isolated dot is formed in each of said plurality of one-dot areas, said second signal level being a level at which no isolated dots are formed in said plurality of one-dot areas; and (b) comparing said threshold values with said image signal, thereby generating a halftone dot signal representing said halftone dots, wherein each isolated dot is one of an isolated lit-up dot and an isolated non-lit-up dot, and each one-dot area includes a plurality of pixels.

2. A method in accordance with claim 1, wherein said first signal level includes a first light-tone level in a light tone range of said image signal and a first dark-tone level in a dark tone range of said image signal, said first light-tone level being a level at which a single pixel is recorded in each of said plurality of one-dot areas, said first dark-tone level being a level at which a single pixel is left unrecorded in each of said plurality of one-dot areas;

said second signal level includes a second light-tone level in the light tone range of said image signal and a second dark-tone level in the dark tone range of said image signal, said second light-tone level being a level at which no pixels are recorded in any of said plurality of one-dot areas, said second dark-tone level being a level at which all pixels are recorded in all of said plurality of one-dot areas; and said halftone dots have a specific halftone structure that is defined by a screen ruling and a screen angle in a middle tone between said first light-tone level and said first dark-tone level.

3. A method in accordance with claim 1, wherein said step (a) comprises the steps of:

preparing a threshold pattern for covering a unit block area, said threshold pattern comprising a distribution of said threshold values so that said isolated dots are dispersed in an irregular manner when the level of said image signal is between said first signal level and said second signal level; and reading said threshold values to be compared with said image signal from said threshold pattern.

4. A method in accordance with claim 1, wherein said step (a) comprises the steps of:

preparing a threshold pattern for covering a unit block area; and modifying a threshold value included in said threshold pattern in an irregular manner when the level of said image signal is between said first signal level and said second signal level, thereby providing a modified threshold value to be compared with said image signal.

5. A method in accordance with claim 4, wherein said first signal level includes a first light-tone level in a light tone range of said image signal and a first dark-tone level in a dark tone range of said image signal, said first light-tone level being a level at which a single pixel is recorded in each of said plurality of one-dot areas, said first dark-tone level being a level at which a single pixel is left unrecorded in each of said plurality of one-dot areas;

said second signal level includes a second light-tone level in the light tone range of said image signal and a second dark-tone level in the dark tone range of said image signal, said second light-tone level being a level at which no pixels are recorded in any of said plurality of one-dot areas, said second dark-tone level being a level at which all pixels are recorded in all of said plurality of one-dot areas; and said threshold pattern includes zero, a value smaller by one than said second dark-tone level, and values ranging from said first light-tone level to said first dark-tone level.

6. A method in accordance with claim 5, wherein said step of modifying comprises the steps of:

modifying said threshold value to be a random number between said second light-tone level and said first light-tone level except said first light-tone level when said threshold value read from said threshold pattern is between said second light-tone level and said first light-tone level; and modifying said threshold value to be a random number between said first dark-tone level and said second dark-tone level except said second dark-tone level when said threshold value read from said threshold pattern is between said first dark-tone level and said second dark-tone level.

7. A method in accordance with claim 1, said method further comprising the steps of:

(c) recording a halftone dot image according to said halftone dot signal; and (d) printing a plurality of said halftone dot images, which are prepared by said steps (a) through (c), one over another in respective colors, thereby reproducing a color print.

8. An apparatus for generating halftone dots in a plurality of one-dot areas in a halftone dot image for use in color printing in response to an image signal, said one-dot area being an area in which one halftone dot is to be formed, said apparatus comprising:

threshold providing means for providing threshold values to make isolated dots in the halftone dot image to be dispersed in an irregular manner when a level of said image signal is between a first signal level and a second signal level, said isolated dots being halftone dots each consisting of one pixel separated from other halftone dots, said first signal level being a level at which one isolated dot is formed in each of said plurality of one-dot areas, said second signal level being a level at which no isolated dots are formed in said plurality of one-dot areas; and a comparator for comparing said threshold values with said image signal, thereby generating a halftone dot signal representing said halftone dots, wherein each isolated dot is one of an isolated lit-up dot and an isolated non-lit-up dot, and each one-dot area includes a plurality of pixels.

9. An apparatus in accordance with claim 8, wherein said first signal level includes a first light-tone level in a light tone range of said image signal and a first dark-tone level in a dark tone range of said image signal, said first light-tone level being a level at which a single pixel is recorded in each of said plurality of one-dot areas, said first dark-tone level being a level at which a single pixel is left unrecorded in each of said plurality of one-dot areas;

said second signal level includes a second light-tone level in the light tone range of said image signal and a second dark-tone level in the dark tone range of said image signal, said second light-tone level being a level at which no pixels are recorded in any of said plurality of one-dot areas, said second dark-tone level being a level at which all pixels are recorded in all of said plurality of one-dot areas; and said halftone dots have a specific halftone structure that is defined by a screen ruling and a screen angle in a middle tone between said first light-tones level and said first dark-tone level.

10. An apparatus in accordance with claim 8, wherein said threshold providing means comprises:

a threshold pattern memory for storing a threshold pattern for covering a unit block area, said threshold pattern comprising a distribution of said threshold values so that said isolated dots are dispersed in an irregular manner when the level of said image signal is between said first signal level and said second signal level; and means for reading said threshold values to be compared with said image signal from said threshold pattern memory.

11. An apparatus in accordance with claim 8, wherein said threshold providing means comprises:

a threshold pattern memory for storing a threshold pattern for covering a unit block area; and threshold modifying means for modifying a threshold value included in said threshold pattern in an irregular manner when the level of said image signal is between said first signal level and said second signal level, thereby providing a modified threshold value to be compared with said image signal.

12. An apparatus in accordance with claim 11, wherein said first signal level includes a first light-tone level in a light tone range of said image signal and a first dark-tone level in a dark tone range of said image signal, said first light-tone level being a level at which a single pixel is recorded in each of said plurality of one-dot areas, said first dark-tone level being a level at which a single pixel is left unrecorded in each of said plurality of one-dot areas;

said second signal level includes a second light-tone level in the light tone range of said image signal and a second dark-tone level in the dark tone range of said image signal, said second light-tone level being a level at which no pixels are recorded in any of said plurality of one-dot areas, said second dark-tone level being a level at which all pixels are recorded in all of said plurality of one-dot areas; and said threshold pattern memory includes zero, a value smaller by one than said second dark-tone level, and values ranging from said first light-tone level to said first dark-tone level.

13. An apparatus in accordance with claim 12, wherein said threshold modifying means comprises:

means for modifying said threshold value to be a random number between said second light-tone level and said first light-tone level except said first light-tone level when said threshold value read from said threshold pattern is between said second light-tone level and said first light-tone level; and means for modifying said threshold value to be a random number between said first dark-tone level and said second dark-tone level except said second dark-tone level when said threshold value read from said threshold pattern is between said first dark-tone level and said second dark-tone level.

14. An apparatus in accordance with claim 8, further comprising:

means for recording a halftone dot image according to said halftone dot signal; and means for printing a plurality of said halftone dot images one over another in respective colors, thereby reproducing a color print.

15. A computer program product for generating halftone dots in a plurality of one-dot areas in a halftone dot image for use in color printing in response to an image signal, said one-dot area being an area in which one halftone dot is to be formed, said computer program product comprising:

a computer readable media; and computer program code means recorded on said computer readable media; wherein said computer program code means comprises:

program code means for causing a computer to provide threshold values to make isolated dots in the halftone dot image to be dispersed in an irregular manner when a level of said image signal is between a first signal level and a second signal level, said isolated dots being halftone dots each consisting of one pixel separated from other halftone dots, said first signal level being a level at which one isolated dot is formed in each of said plurality of one-dot areas, said second signal level being a level at which no isolated dots are formed in said plurality of one-dot areas; and program code means for causing the computer to compare said threshold values with said image signal, thereby generating a halftone dot signal representing said halftone dots, wherein each isolated dot is one of an isolated lit-up dot and an isolated non-lit-up dot, and each one-dot area includes a plurality of pixels.

* * * * *